US006981057B2

(12) United States Patent
Theriault et al.

(10) Patent No.: US 6,981,057 B2
(45) Date of Patent: Dec. 27, 2005

(54) DATA STORAGE WITH STORED LOCATION DATA TO FACILITATE DISK SWAPPING

(75) Inventors: Eric Yves Theriault, Montreal (CA); Le Huan Tran, Pointe-Clare (CA)

(73) Assignee: Autodesk Canada Co., Montreal (CA)

( * ) Notice: Subject to any disclaimer, the term of this patent is extended or adjusted under 35 U.S.C. 154(b) by 255 days.

(21) Appl. No.: 10/124,093

(22) Filed: Apr. 17, 2002

(65) Prior Publication Data

US 2002/0165930 A1 Nov. 7, 2002

(30) Foreign Application Priority Data

Apr. 20, 2001 (GB) .............................. 0109745

(51) Int. Cl.$^7$ ...................... G06F 15/173; G06F 15/167
(52) U.S. Cl. ........................ 709/239; 709/221; 710/38; 710/316; 710/317; 711/114; 714/6; 725/94; 725/95; 345/502; 345/536
(58) Field of Search ................................. 709/213, 214, 709/221, 223, 238–240; 710/38, 316, 317; 711/114; 714/6; 725/94, 95, 32; 707/10, 9; 345/501, 502, 505, 545, 733, 741, 536

(56) References Cited

U.S. PATENT DOCUMENTS

| 5,471,592 | A | | 11/1995 | Gove et al. | |
|---|---|---|---|---|---|
| 6,118,931 | A | * | 9/2000 | Bopardikar | 386/125 |
| 6,185,601 | B1 | * | 2/2001 | Wolff | 709/203 |
| 6,389,432 | B1 | * | 5/2002 | Pothapragada et al. | 707/205 |
| 6,404,975 | B1 | * | 6/2002 | Bopardikar et al. | 386/46 |
| 6,542,954 | B1 | * | 4/2003 | Aruga | 710/316 |
| 6,542,961 | B1 | * | 4/2003 | Matsunami et al. | 711/114 |
| 2001/0029612 | A1 | * | 10/2001 | Harnois | 725/86 |
| 2002/0165927 | A1 | * | 11/2002 | Theriault et al. | 709/213 |
| 2003/0126224 | A1 | * | 7/2003 | Harnois et al. | 709/214 |

FOREIGN PATENT DOCUMENTS

| EP | 0 316 956 A2 | 5/1989 |
|---|---|---|
| EP | 0 535 807 A2 | 4/1993 |
| GB | 2 298 335 | 8/1996 |
| GB | 2 337 409 | 11/1999 |
| GB | 2 362 771 A | 11/2001 |
| JP | 11220475 A | 2/1998 |
| JP | 11331236 A | 5/1998 |
| WO | WO 90/05422 | 5/1990 |
| WO | WO 00/58856 | 10/2000 |
| WO | WO 01/54350 A2 | 7/2001 |

* cited by examiner

*Primary Examiner*—Hong Kim
(74) *Attorney, Agent, or Firm*—Gates & Cooper LLP

(57) ABSTRACT

A first image processing system, a second image processing system, a first storage system and a second storage system communicate over a high bandwidth switch. The switch connects the first processing system to the first storage system and also connects the second processing system to the second storage system. At the first image processing system, first location data is read to identify the location of frames on the first frame storage system. Similarly, at the second image processing system second location data is read to identify the location frames on the second frame storage system. In response to control commands issued to the switch, the first image processing system is disconnected from the first storage system and reconnected to the second storage system. Similarly, the second processing system is disconnected from the second storage system and reconnected to the first storage system. In response to the reconnection operations, the second location data is read at the first image processing system and the first location data is read at the second processing system. In this way, immediate and automatic access to the reconnected storage systems is achieved.

20 Claims, 22 Drawing Sheets

801

| FRAME ID | STORAGE LOCATION |
|---|---|
| 561000001 | 040000 |
| 561000002 | 040001 |
| 561000003 | 040002 |
| 561000004 | 040003 |
| 561000005 | 040004 |

901 → FRAME ID ; STORAGE LOCATION ← 902

*Figure 9*

| SYSTEM ETHERNET ADDRESS | SYSTEM SWITCH ADDRESS | FRAMESTORE SWITCH ADDRESS |
|---|---|---|
| 192.168.25.42 | 0x01000001 | 0x01000011 |
| 192.168.25.52 | 0x01000002 | 0x01000016 |
| 192.168.25.54 | 0x01000003 | 0x01000009 |
| 192.168.25.56 | 0x01000004 | 0x01000012 |
| 192.168.25.64 | 0x01000005 | 0x01000013 |
| 192.168.25.65 | 0x01000006 | 0x01000014 |
| 192.168.25.72 | 0x01000007 | 0x01000015 |
| 192.168.25.74 | 0x01000008 | 0x01000010 |

*Figure 10*

```
1101 ─┐  FRAMESTORE=BRAZIL      HADDR=192.168.25.56  ID=56
        FRAMESTORE=SCOTLAND    HADDR=192.168.25.74  ID=74
        FRAMESTORE=FINLAND     HADDR=192.168.25.72  ID=72
        FRAMESTORE=AUSTRIA     HADDR=192.168.25.54  ID=54
        FRAMESTORE=SYRIA       HADDR=192.168.25.64  ID=64
        FRAMESTORE=KUWAIT      HADDR=192.618.25.42  ID=42
        FRAMESTORE=BOLIVIA     HADDR=192.168.25.65  ID=65
        FRAMESTORE=ARGENTINA   HADDR=192.168.25.52  ID=52
```

*Figure 11*                                                       343

DATA STORAGE WITH STORED LOCATION DATA TO FACILITATE DISK SWAPPING

CROSS-REFERENCE TO RELATED APPLICATIONS

This application claims the benefit under 35 U.S.C. §119 of the following co-pending and commonly assigned foreign patent application, which application is incorporated by reference herein:

United Kingdom patent application number 01 09 745.0, entitled "IMAGE DATA PROCESSING," filed on Apr. 20, 2001, by Eric Yves Theriault, et. al.

This application is related to the following co-pending and commonly-assigned patent(s)/patent applications, which patent(s)/applications are incorporated by reference herein:

U.S. patent application Ser. No. 08/835,960, filed Apr. 11, 1997, by Raju C. Bopardikar, entitled "VIDEO DATA STORAGE", now U.S. Pat. No. 6,118,931, issued on Sep. 12, 2000, attorneys' docket number 30566.207-US-01, which patent claims the benefit of U.S. application serial No. 60/015,412 filed on Apr. 15, 1996;

U.S. patent application Ser. No. 08/843,282, filed on Apr. 14, 1997, by Raj C. Bopardikar et al, entitled "VIDEO STORAGE", now U.S. Pat. No. 6,404,975, issued Jun. 11, 2002, which application claims the benefit of U.S. application Ser. No. 60/015,468 filed on Apr. 15, 1996, and United Kingdom application serial number 9619120 filed on Sep. 12,1996, now United Kingdom Patent Number 2 312 319 issued on Nov. 10, 1998;

U.S. patent application Ser. No. 09/738,478, filed Dec. 15, 2000, by Stephane Harnois, entitled "NETWORK SYSTEM FOR IMAGE DATA", now abandoned, which application claims the benefit of United Kingdom application serial number 0008318.8 filed on Apr. 6, 2000;

U.S. patent application Ser. No. 09/925,597, filed Aug. 9, 2001, by Eric Yves Theriault et. al., entitled "IMAGE PROCESSING", which application claims the benefit of United Kingdom application serial number 0109750.0 filed Apr. 20, 2001; and U.S. patent application Ser. No. 10/124,074, filed on Apr. 17, 2002, by Stephane Hamois et al, entitled "GIVING ACCESS TO NETWORKED STORAGE DEPENDENT UPON LOCAL DEMAND", now U.S. Pat. No. 6,792,373, issued Sep. 14, 2004, which application claims the benefit of United Kingdom application serial number 0109753.4 filed Apr. 20,2001.

BACKGROUND OF THE INVENTION

Field of the Invention

The present invention relates to image data processing in which a first host processing system communicates with a respective storage system and a second host processing system communicates with a second storage system.

Devices for the real time storage of image frames, derived from video signals or derived from the scanning of cinematographic film, are disclosed in the present assignee's U.S. Pat. No. 6,118,9031. In the aforesaid patent, systems are shown in which image frames are stored at display rate by accessing a plurality of storage devices in parallel under a process known as striping.

Recently, there has been a trend towards networking a plurality of systems of this type. An advantage of connecting systems of this type in the network is that relatively low powered machines may be deployed for relatively simple tasks, such as the transfer of image frames from external media, thereby allowing the more sophisticated equipment to be used for the more processor-intensive tasks such as editing and compositing etc. However, a problem then exists in that data may have been captured to a first file storage system having a direct connection to a first processing system but, for subsequent manipulation, access to the stored data is required by a second processing system.

BRIEF SUMMARY OF THE INVENTION

According to an aspect of the present invention there is provided image data processing apparatus, comprising a first host processing system and a second host processing system. A first frame storage means is connected to the first processing system by a high band width connection and a second frame storage means is connected to the second processing system via a high band width connection. The first image processing system reads first location data to identify the location of frames on the first frame storage means. The second image processing system reads second location data to identify the location of frames on the second frame storage means. First image processing system is disconnected from the first frame storage means and reconnected to the second frame storage means. The second image processing system is disconnected from the second frame storage means and reconnected to the first frame storage means. The first image processing system reads the second location data to enable direct access to the reconnected second storage means. The second image processing system reads the first location data to enable direct access to the reconnected second storage means.

Thus, in order to avoid unnecessary transfer of data between storage systems, it is possible to physically reconnect storage systems after the mutual access of relevant location data.

BRIEF DESCRIPTION OF THE SEVERAL VIEWS OF THE DRAWINGS

FIG. 9 details location data as shown in FIG. 8;

FIG. 10 shows an example of a switch-connections table as shown in FIG. 3;

FIG. 11 shows an example of a network configuration file as shown in FIG. 3;

BEST MODE FOR CARRYING OUT THE INVENTION

FIG. 1

Figure 1:
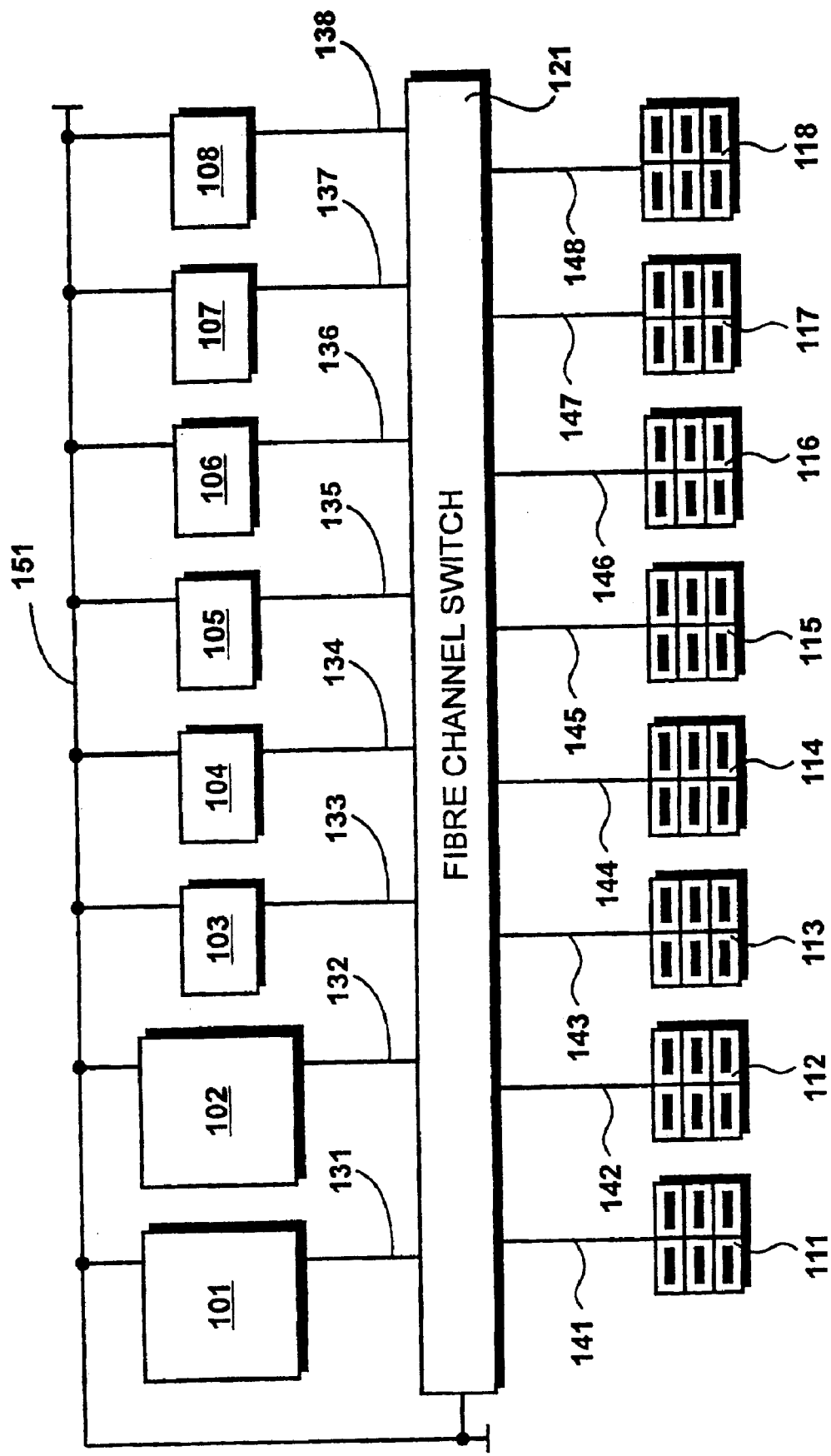
FIG. 1 shows a data processing environment, including image data processing systems and frame storage disk arrays.

An example of a networked image data processing environment is illustrated in FIG. 1. An environment of this type is described in the present assignee's co-pending United Kingdom Patent Application No. 00 08 318. The network includes two on-line image data processing systems 101, 102, and six off-line image data processing systems 103, 104, 105, 106, 107 and 108. Each processing system 101 to 108 has a respective frame storage disk array (hereafter referred to as a framestore) 111, 112, 113, 114, 115, 116, 117 and 118. For example, each framestore 111 to 118 may be of the type supplied by the present assignee under the Trademark "STONE" and includes several high capacity hard disk drives arranged to supply and store image data in parallel across many individual drives at once. The drives are configured as a redundant array of inexpensive disks (RAID). Further details of the RAID system are disclosed in British Patent No 2 312 319 (U.S. Ser. No. 08/843,282) assigned to the present Assignee.

Each of the framestores is operated under the direct control of its respective processing system. Thus, framestore 111 is operated under the direct control of image data processing system 101 and framestore 113 is operated under the direct control of off-line processing system 103.

The environment includes a sixteen port non-blocking fibre channel switch type 121, such as the type made available under the trademark 'GADZOOX'. The switch is employed within the data processing environment to allow fast full bandwidth accessibility between each host processor 101 to 108 and each framestore 111 to 118. Each data processing system 101 to 108 is connected to the fibre channel switch by a respective fibre channel 131 to 138. Similarly, each framestore is connected to the fibre channel switch via a respective fibre channel 141 to 148. An Ethernet network 151 allows communication between the data processing systems 101 to 108 and the fibre channel switch 121.

Within the environment, a single processing system, such as system 101, is selected as channel switch master. Under these conditions, it is not necessary for all of the processing systems to be operational but system 101 must be switched on and connected to the Ethernet before communication can take place through the switch. However, in most operational environments, all of the processing systems would remain operational unless shut down for maintenance or upgrade etc.

Processing system 101 communicates with the fibre channel switch 121 over the Ethernet network 151. Commands issued by processing system 101 to the fibre channel switch define physical switch connections between processing systems 101 to 108 and framestores 111 to 118.

Hence although each framestore is controlled by only one of processing systems 101 to 108, it is possible for a processing system to gain temporary access to a framestore connected to another processing system.

For example, if processing system 102 is performing a task which mainly uses images stored in the framestore 112 which it controls, but also requires some frames from framestore 113, then processing system 102 issues requests for these frames over Ethernet 151 to processing system 103 which controls framestore 113.

However, requesting a lot of frames in this way can be extremely time-consuming since a processing system will always give itself priority to its own framestore, and so realtime access cannot be gained in this way. The only way to access images in realtime is to have them stored on a directly connected framestore, which presently means that images required by a particular processing system must be loaded by that processing system. Also, when a set of images has been edited it must be archived to make disk space for the next set of images and again this must be done on the machine which edited the frames. However, an expensive processor and a skilled operator are required for complex manipulation of images and realtime access, and archiving and loading data can be done by a much less powerful machine and an unskilled operator.

Hence the switch may be used to allow processing systems to swap framestores. For example, while processing system 102 is performing a task, processing system 103 may be loading data necessary for the next task for processing system 102. When processing system 102 completes the current task it may swap framestores with processing system 103 and have immediate access to the frames necessary for its next task. Processing system 103 may now archive the results of the task which processing system 102 has just completed. This ensures that the largest and fastest processing systems are always used in the most efficient way.

When this swap has occurred, processing system 102 is the controller of framestore 113 and processing system 103 is the controller of framestore 112. Any requests for access to either of these framestores must be made to the new controller. For example, if any processing system, including processing system 102, requires access to framestore 112 it must request this from processing system 103.

Figure 8:
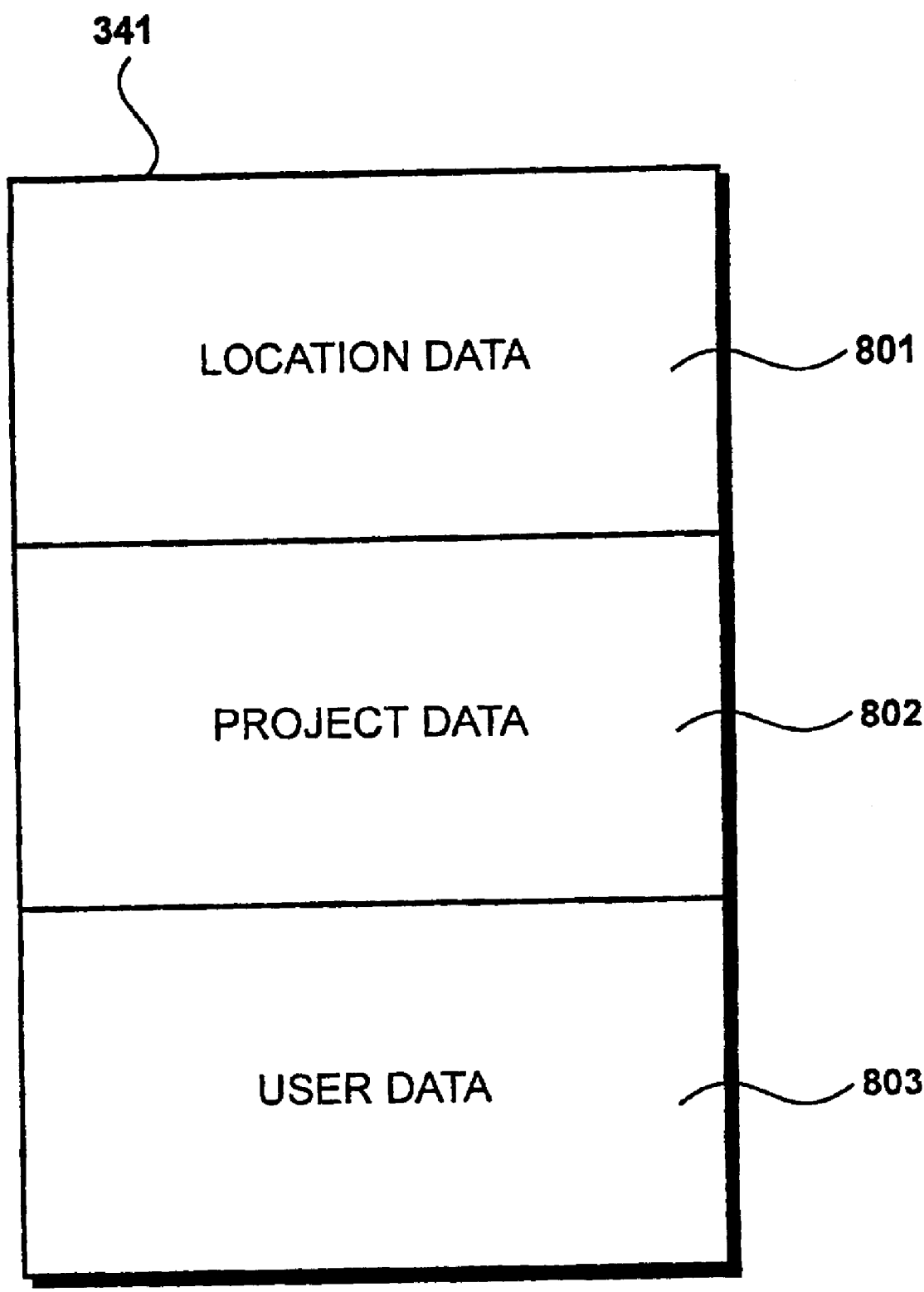
FIG. 8 shows an example of metadata contained on a hard drive as shown in FIG. 3.

On first start-up, the fibre channel switch 121 is placed in the default condition to the effect that each processor is connected through the switch 121 to its respective framestore. If processing system 101 is shut down for maintenance or any other reason then when processing system 101 is restarted it will place the fibre channel switch in the same condition that it was in when it was switched off, rather than reverting to the default condition. The information necessary to perform this reconnection is stored in switch connections data, an example of which is illustrated in FIG. 8.

Similarly, if any processing system is shut down then when it is rebooted it will control the same framestore which it did when it was shut down. Thus, on the first booting up of processing system 102, for example, it mounts framestore 112, but if when processing system 102 was shut down it controlled framestore 117 it would mount framestore 117 again on booting up. Thus each processing system is host to a particular framestore, which may or may not be the one which it originally controlled when the network was set up.

FIG. 2

Figure 2:
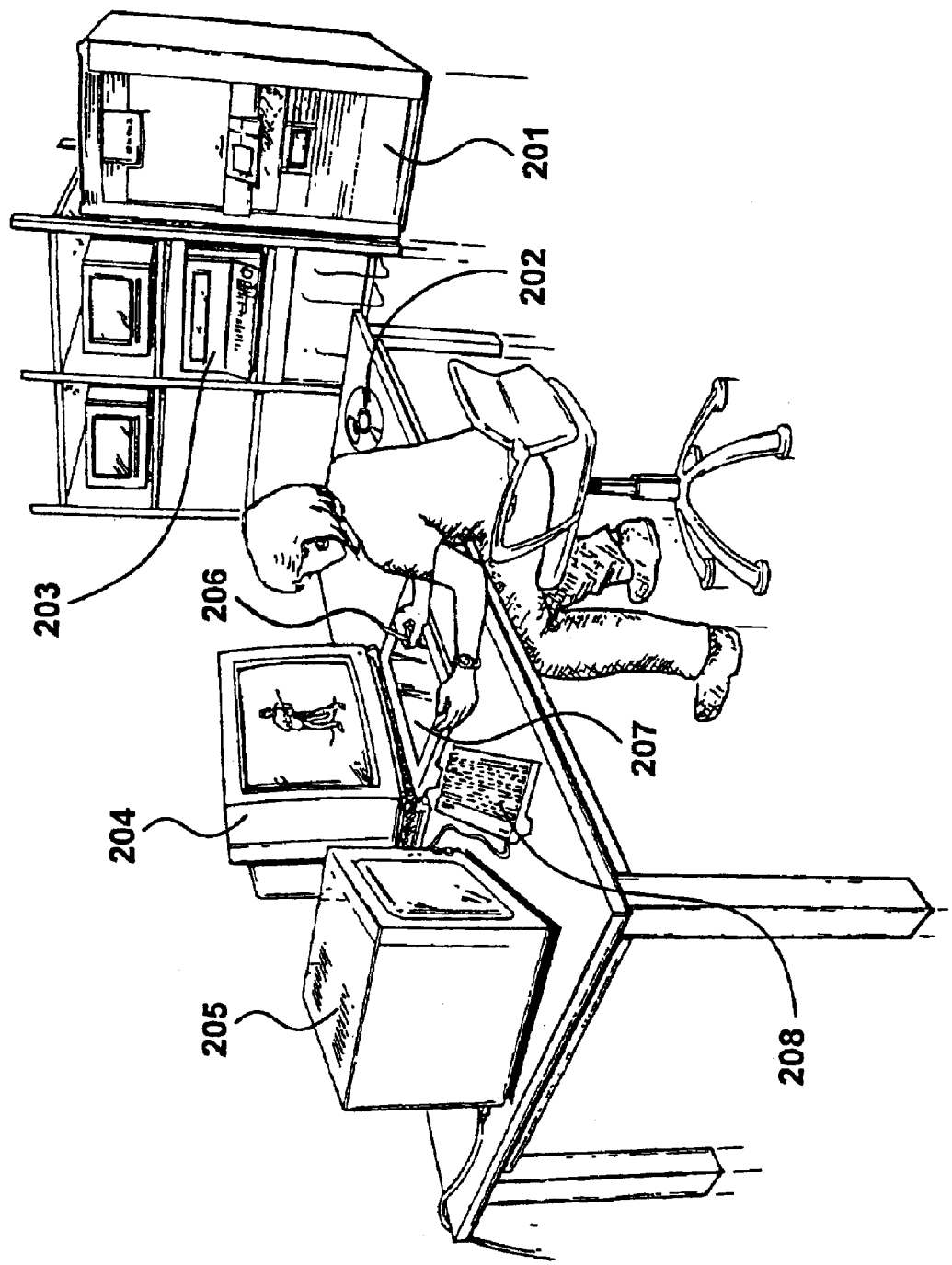
FIG. 2 illustrates an on-line processing system as shown in FIG. 1.

An image data processing system, such as processing system 101, is illustrated in FIG. 2, based around an Onyx2 computer 201. Program instructions executable within the Onyx2 computer 201 may be supplied to said computer via a data carrying medium, such as a CD ROM 202.

Image data may be loaded locally and recorded locally via a local digital video tape recorder 203 but preferably the transferring of data of this type is performed off-line, using stations 103 to 108.

An on-line editor is provided with a visual display unit 204 and a high quality broadcast quality monitor 205. Input commands are generated via a stylus 206 applied to a touch table 207 and may also be generated via a keyboard 208 and/or a mouse (not shown).

FIG. 3

Figure 3:
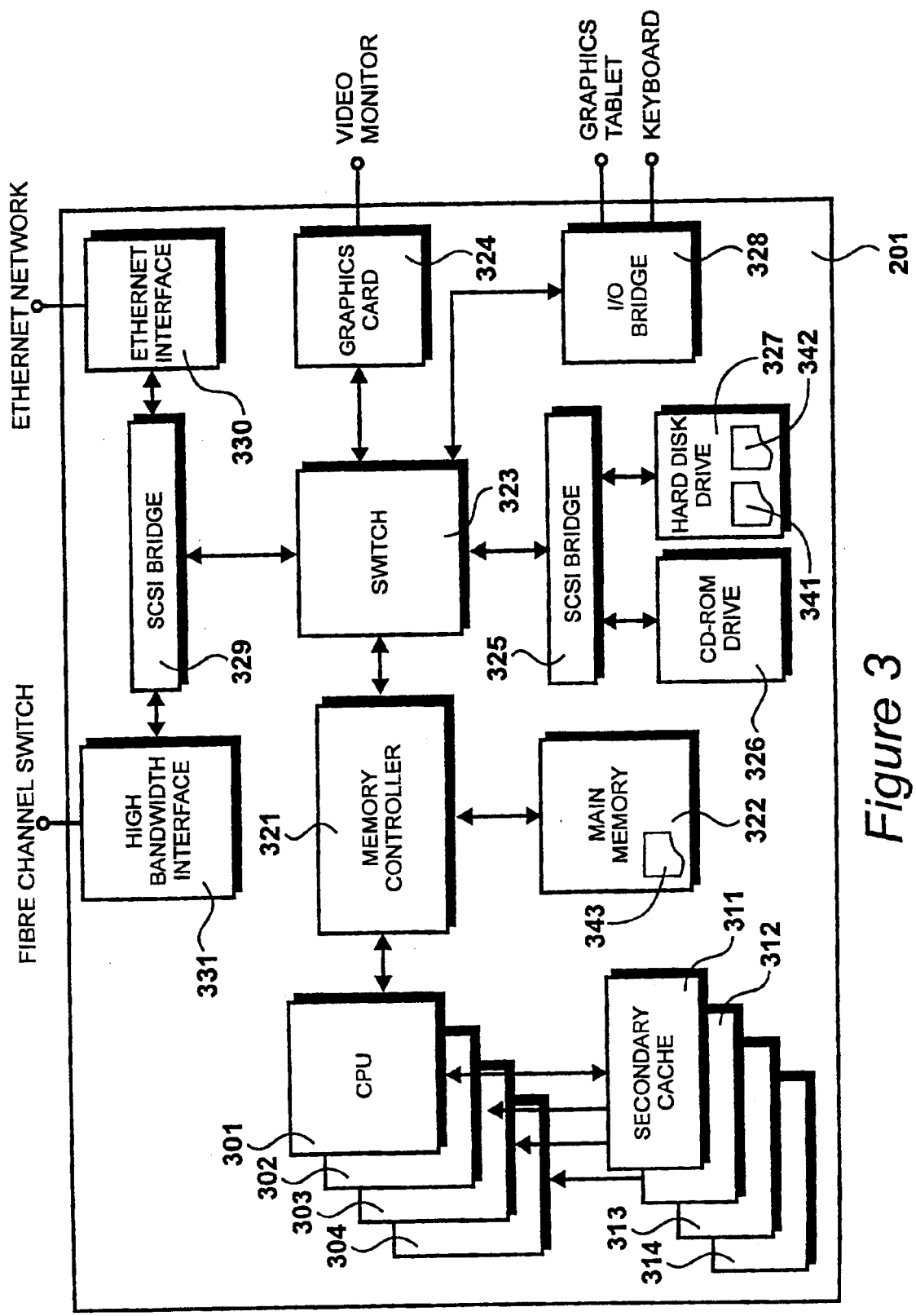
FIG. 3 details an on-line processor as illustrated in FIG. 2.

The computer 201 shown in FIG. 2 is detailed in FIG. 3. The processing system 201 comprises four central processing units 301, 302, 303 and 304 operating in parallel. Each of these processors 301 to 304 has a dedicated secondary cache memory 311, 312, 313 and 314 that facilitate per-CPU storage of frequently used instructions and data. Each CPU 301 to 304 further includes separate primary instruction and data cache memory circuits on the same chip, thereby facilitating a further level of processing improvement. A memory controller 321 provides a common connection between the processors 301 to 304 and a main memory 322. The main memory 322 comprises two gigabytes of dynamic RAM.

The memory controller 321 further facilitates connectivity between the aforementioned components of the computer 201 and a high bandwidth non-blocking crossbar switch 323. The switch makes it possible to provide a direct high capacity connection between any of several attached circuits, including a graphics card 324. The graphics card 324 generally receives instructions from the processors 301 to 304 to perform various types of graphical image rendering processes, resulting in images, clips and scenes being rendered in real time.

A SCSI bridge 325 facilitates connection between the crossbar switch 323 and a CDROM drive 326. The CDROM drive provides a convenient way of receiving large quantities of instructions and data, and is typically used to install instructions for the processing system 201 onto a hard disk drive 327. Once installed, instructions located on the hard disk drive 327 may be transferred into main memory 806 and then executed by the processors 301 to 304. An input output (I/O) bridge 328 provides an interface for the graphics tablet 207 and the keyboard 208, through which the user is able to provide instructions to the computer 201.

A second SCSI bridge 329 facilitates connection between the crossbar switch 323 and network communication interfaces. Ethernet interface 330 is connected to the Ethernet network 151 and high bandwidth interface 331 is connected to the fibre channel switch 121 by connection 131. In an alternative embodiment, high bandwidth interface 331 is connected to a high bandwidth network such as "HiPPI", which is known to those skilled in the art.

On the hard drive 327 of processor 201 metadata 341 is stored. This is data relating to the location and format of images stored on the framestore which processing system 101 currently controls. Also stored on the hard drive 327 is switch connection data 342. This is only on processing system 101, so that processing system 102 is identical to system 101 in every way except that it does not have data 342. Switch connection data 342 gives details about what physical connections have been made inside the fibre channel switch.

Stored in the main memory 322 of processor 201 is a network configuration file 343 which contains information about how to contact each of the Ethernet-connected framestores, and also informs a user which framestores are not currently available to access because their controlling processing system has been shut down. This is written when processing system 101 starts up and is continually updated all the time that processor 201 is switched on. When processing system 101 starts up it multicasts its local connections to all other Ethernet-connected processing systems within the network and receives answers from each of them about their local connections. Network configuration file 343 can therefore be compiled from these answers, while all other processing systems can add the details of system 101 to their respective network configuration files. Similar processes take place when a processing system shuts down, crashes or swaps framestores with another processing system.

Network configuration file 343 is different from switch connection data 342 in that file 343 identifies framestores according to an ID and a name and associates them with the Ethernet address of the controlling processing system. Data 342 only contains information about the connections within the fibre channel switch and includes no information about the framestores, although it still associates each connection with the Ethernet address of the controlling processing system.

In addition, there is a network configuration file in the memory of each of processing systems 101 to 108, whereas switch connection data 342 is only stored on processing system 101.

FIG. 4

Figure 4:
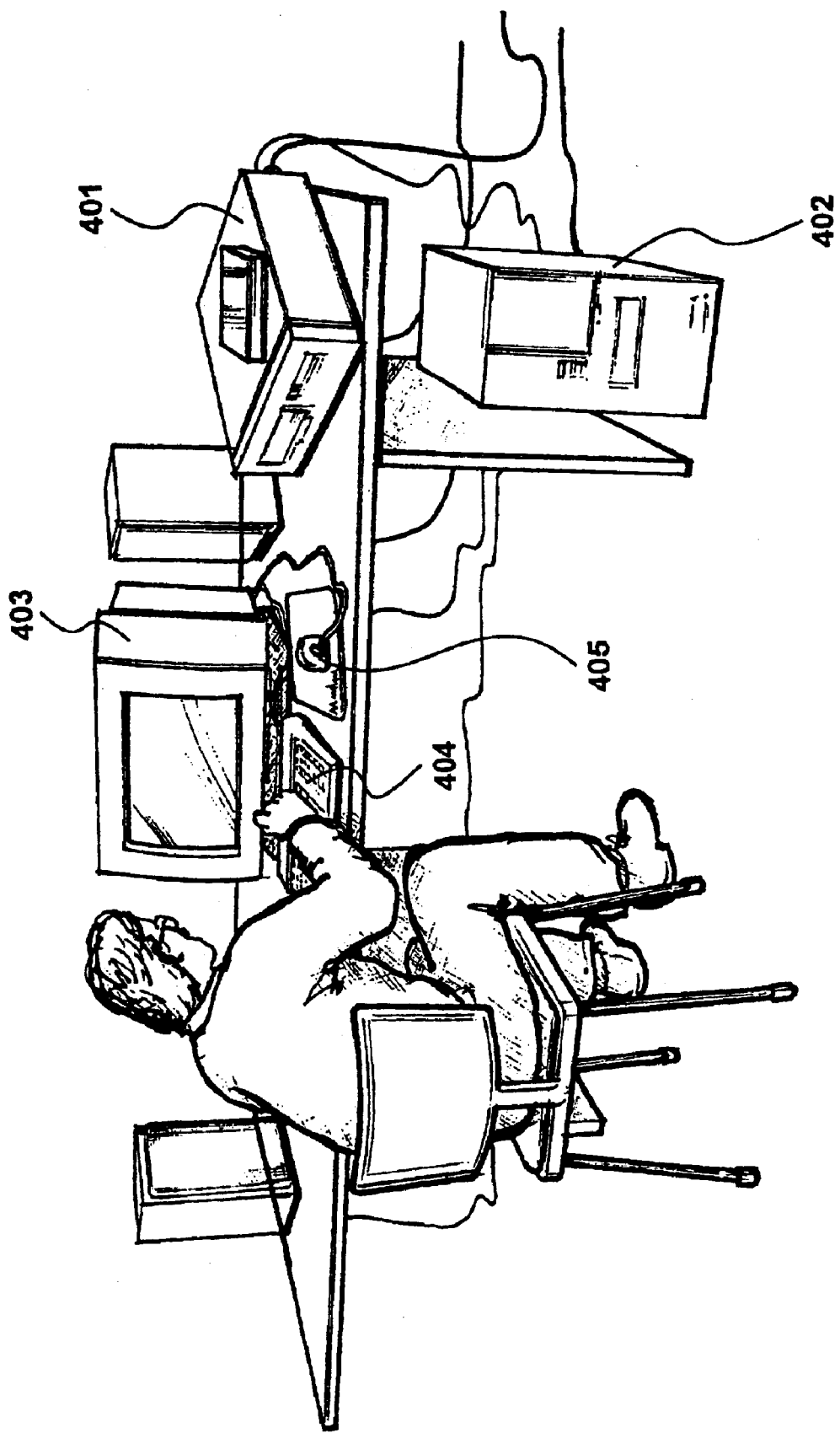
FIG. 4 illustrates an off-line processing system as shown in FIG. 1.

An off-line processing system, such as processing system 103, is detailed in FIG. 4. New input material is loaded via a high definition video recorder 401. Operation of recorder 401 is controlled by a computer system 402, possibly based around a personal computer (PC) platform. In addition to facilitating the loading of high definition images to framestores, processor 402 may also be configured to generate proxy images, allowing video clips to be displayed via a monitor 403. Off-line editing manipulations may be performed using these proxy images, along with other basic editing operations. An offline editor controls operations via manual input devices including a keyboard 404 and mouse 405.

FIG. 5

Figure 5:
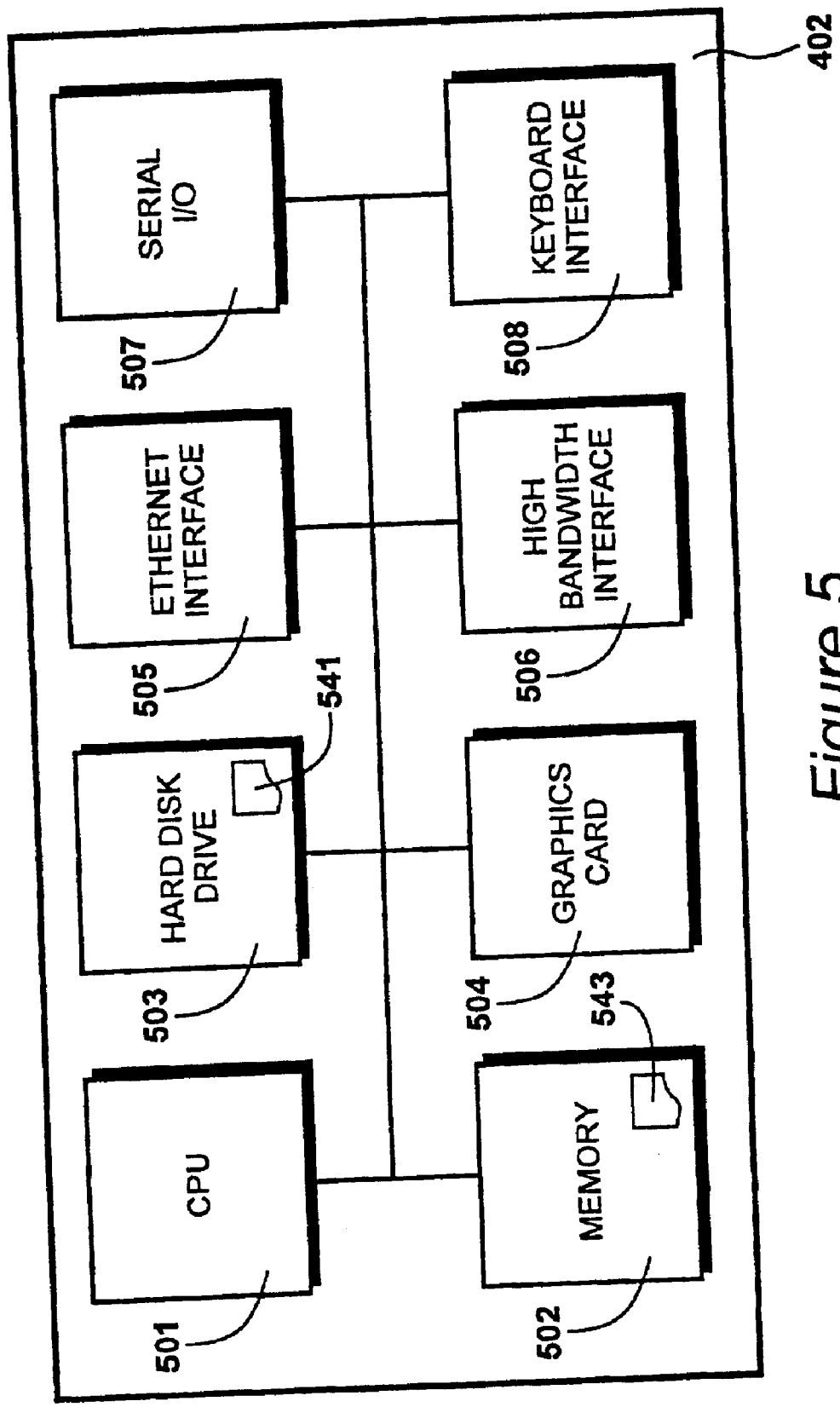
FIG. 5 details an off-line processor as illustrated in FIG. 4.

Processor 402 as shown in FIG. 4 is detailed in FIG. 5. Processor 402 comprises a central processing unit (CPU) 501. This is connected via data and address connections to memory 502. A hard disk drive 503 provides non-volatile high capacity storage for programs and data. A graphics card 504 receives commands from the CPU 501 resulting in the update and refresh of images displayed on the monitor 405. Ethernet interface 505 enables network communication over the Ethernet network 151. A high bandwidth interface 506 allows communication via high bandwidth switch 121. A keyboard interface 508 provides connectivity to the keyboard 404, and a serial I/O circuit 507 receives data from the mouse 405.

Network configuration file 543 is identical to network configuration file 343, and metadata 541 contains data about the images stored on the framestore which processing system 104 currently controls, with an identical structure to metadata 341 but containing different data.

FIG. 6

Figure 6:
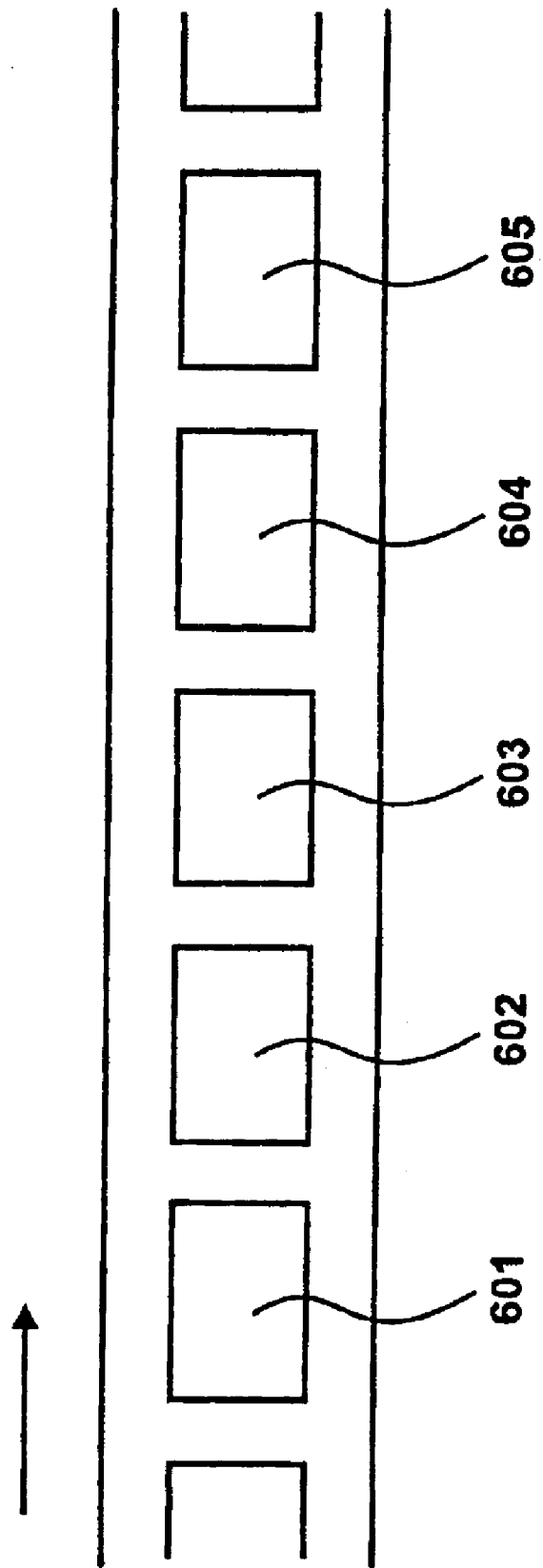
FIG. 6 illustrates image frames of the type processed by the system shown in FIG. 1.

A plurality of video image frames 601, 602, 603, 604 and 605 are illustrated in FIG. 6. Each frame in the clip has a unique frame identification (frame ID) such that, in a system containing many clips, each frame may be uniquely identified. In a system operating with standard broadcast quality images, each frame consumes approximately one megabyte of data. Thus, by conventional data processing standards, frames are relatively large, therefore even on a relatively large disk array the total number of frames that may be stored is ultimately limited. An advantage of this situation, however, is that it is not necessary to establish a sophisticated directory system thereby assisting in terms of frame identification and access.

FIG. 7

Figure 7:
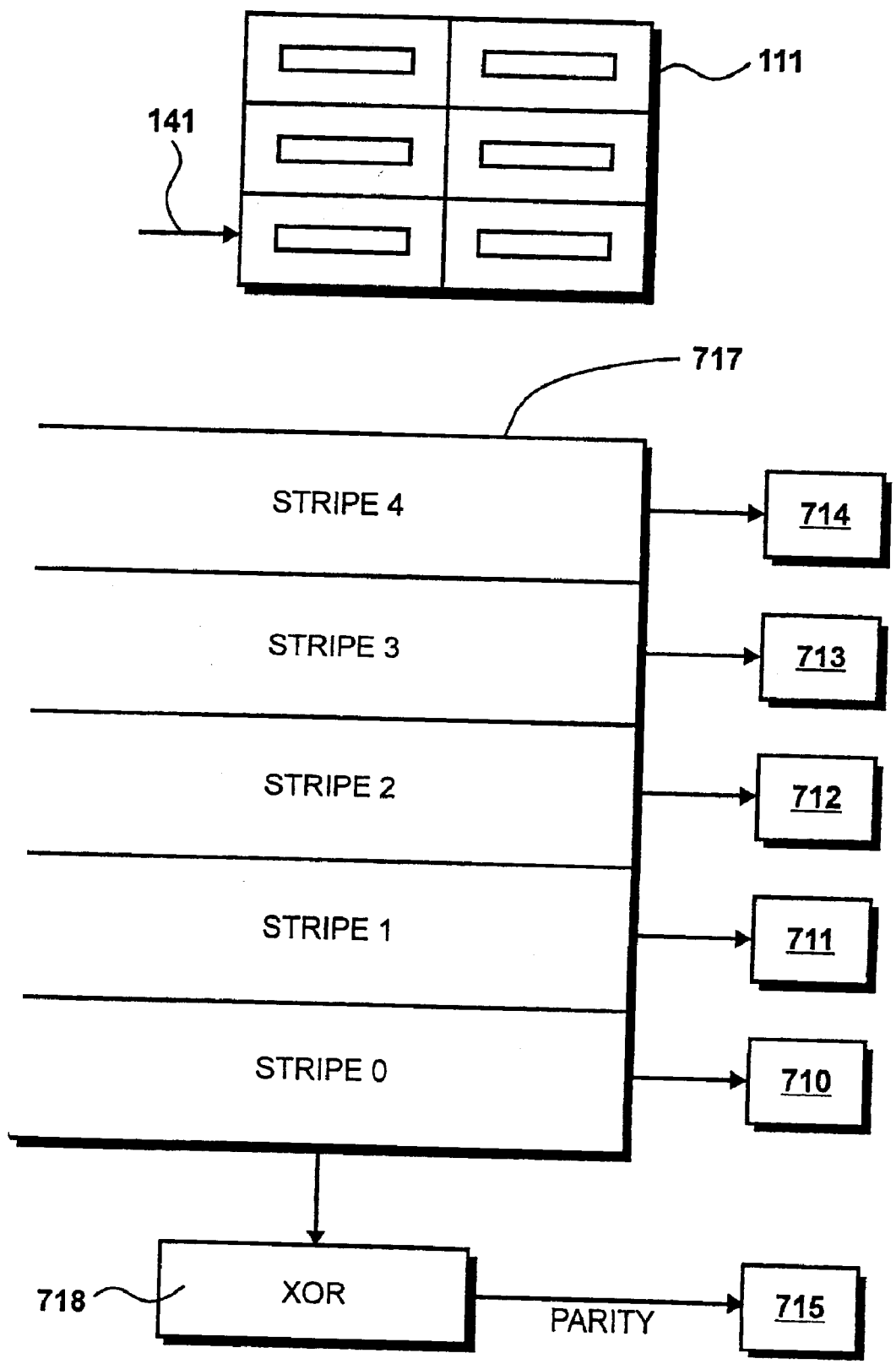
FIG. 7 illustrates a redundant array of inexpensive disks accessed by a fibre channel interface.

A framestore, such as framestore 111, is illustrated in FIG. 7. The framestore 111, connected to the fibre channel switch by fibre channel 141, includes six physical hard disk drives, illustrated diagrammatically as drives 710, 711, 712, 713 and 714. In addition to these five disks configured to receive image data, a sixth redundant disk 715 is provided.

An image field 717, stored in a buffer within memory, is divided into five stripes identified as stripe zero, stripe one, stripe two, stripe three and stripe four. The addressing of data from these stripes occurs using similar address values with multiples of an off-set value applied to each individual stripe. Thus, while data is being read from stripe zero, similar address values read data from stripe one but with a unity off-set. Similarly, the same address values are used to read data from stripe two with a two unit off-set, with stripe three having a three unit off-set and stripe four having a four unit off-set. In a system having many storage devices of this type and with data being transferred between storage devices, a similar striping off-set is used on each system.

As similar data locations are being addressed within each stripe, the resulting data read from the stripes is XORd together by process 718, resulting in redundant parity data being written to the sixth drive 715. Thus, as is well known in the art, if any of disk drives 710 to 714 should fail it is possible to reconstitute the missing data by performing a XOR operation upon the remaining data. Thus, in the configuration shown in FIG. 7, it is possible for a damaged disk to be removed, replaced by a new disk and the missing data to be re-established by the XORing process. Such a procedure for the reconstitution of data in this way is usually referred to as disk healing.

FIG. 8

FIG. 8 shows metadata 341. The metadata comprises location data 801, project data 802 and user data 803. Location data 801 is used to identify the point within a framestore at which each frame starts. Project data 802 contains information enabling image processing applications to read the frames and user data 803 contains user preferences.

FIG. 9

FIG. 9 details location data 801. Column 901 lists the frame identification references (frame IDs) of all the frames stored within the framestore controlled by processing system 101. Each frame ID contains a two-digit number which corresponds to the framestore identification reference (framestore ID), so that the framestore on which an image is stored can be immediately identified from the frame ID. The remaining digits within each frame ID uniquely identify each frame within that framestore. Column 902 gives a unique location within the framestore for each of these frames.

This information is used whenever a processing system accesses this framestore, whether it is the controlling system or a different one. For instance, if processing system 106 wishes to access the framestore controlled by processing system 101, system 101 must initially send location data 801, and also any other information about the frames which may be stored in project data 802 or user data 803, to system 106 in order for system 106 to determine the location of the desired frames before access can be achieved.

FIG. 10

FIG. 10 shows the switch connections data 342 stored on the hard drive 327 of processing system 101. Every Ethernet-connected processing system is listed in this table. Column 1001 gives the Ethernet address of a processing system, column 1002 gives the switch address of a processing system and column 1003 gives the switch address of the framestore which it currently controls.

This table is used by the switch-controlling daemon on processing system 101 to reconnect a framestore and its controlling processing system whenever another processing system has been allowed access or if the processing system has been rebooted. The data in this table is changed only when a framestore swap takes place.

FIG. 11

FIG. 11 shows network configuration file 343. Each line gives information about a connection between one framestore and one processing system. Line 1101 shows framestore 'Brazil'. This is the name given to this framestore to make differentiating between framestores easier for users. HADDR stands for Hardware Address, and this gives the Ethernet address of the processing system which currently controls framestore 'Brazil'. Fifty-six is the identification reference of this framestore. Reference to FIG. 9 shows that this is the framestore controlled by processing system 101, since the frame IDs which comprise location data 801 all contain the framestore ID fifty-six.

Any framestore which is not listed in network configuration file 343 is not available for access, since its controlling processing system has been shut down.

The data stored in network configuration file 343 is used whenever processing system 101 requires access to another framestore. A user selects a number of frames which he wishes to view. Any one selection will be all from one clip and therefore stored on one framestore. The frame IDs contain the framestore ID and the network configuration file associates an Ethernet address with that framestore ID. The requests can therefore be sent to the processing system controlling the framestore on which the images are stored. No identification need be made by the user of a framestore or a processing system, only of the frames which he requires.

FIG. 12

Figure 12:
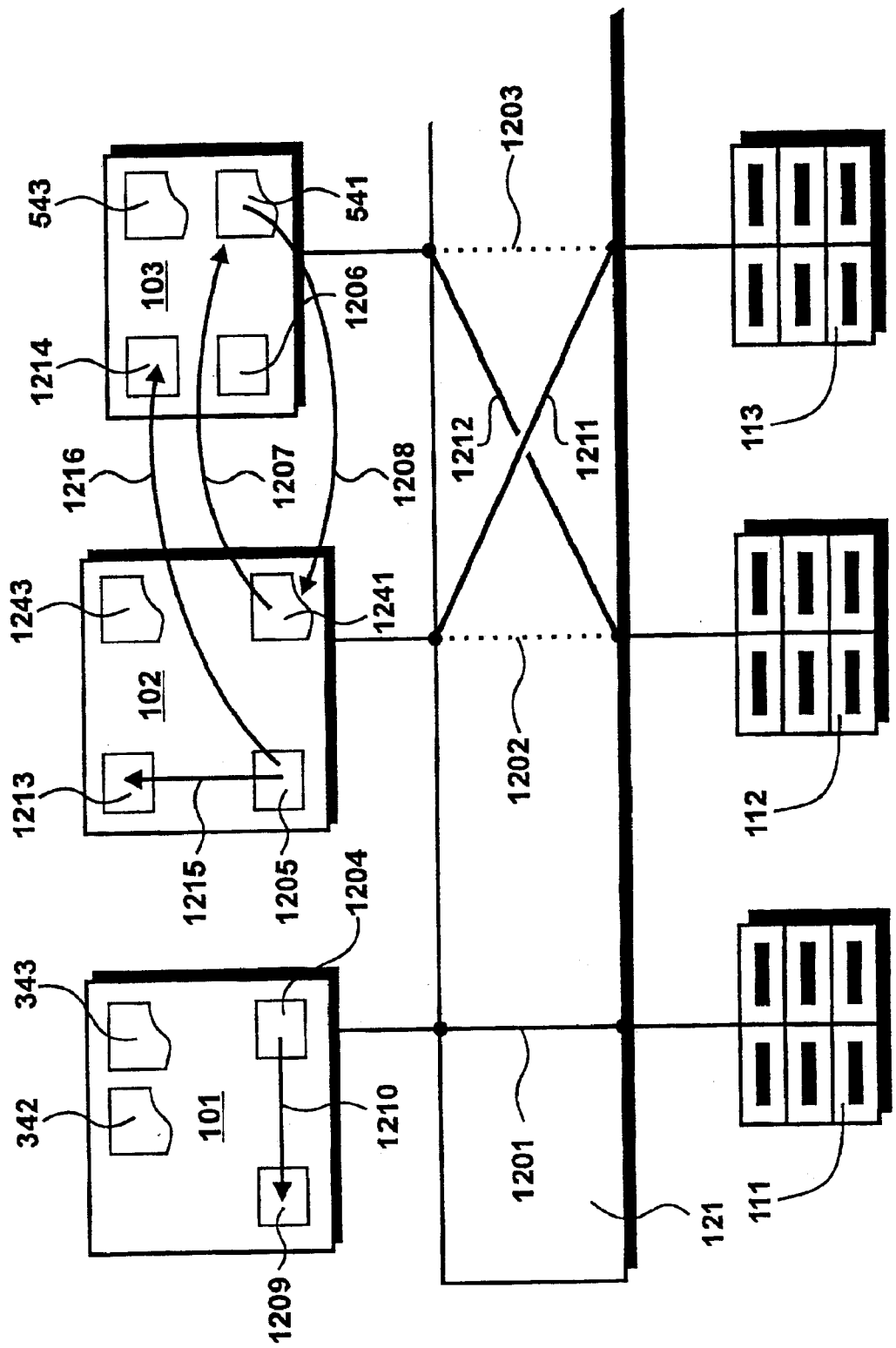
FIG. 12 illustrates a swap of framestores between two processing systems.

FIG. 12 illustrates the embodiment of the invention. Three processing systems are illustrated, 101, 102 and 103, together with their respective framestores 111, 112 and 113. Each processing system is connected to its respective framestore via fibre channel switch 121, as illustrated by connections 1201, 1202 and 1203.

As shown in FIG. 3, processing system 101 has switch connections data 342 stored on its hard drive and network configuration file 343 stored in its memory. Metadata 341 is not shown.

As shown in FIG. 5, processing system 103 has metadata 541 on its hard drive, containing information about framestore 113 which it currently controls, which is similar to the metadata shown in FIG. 8. Similarly, processing system 102 has metadata 1241, relating to framestore 112, on its hard drive. The network configuration files on processing systems 102 and 103 are not shown.

This figure illustrates a framestore swap. Processing system 102 has completed a task and the images now need archiving. Processing system 103 has meanwhile been loading the frames that system 102 needs for its next task. Both users agree to swap framestores and close down all applications which require access to the framestore or metadata. A user on any processing system, whether involved in the swap or not, initiates the swap by starting a swap-control process 1204. In this example, it is the user on processing system 101. This process may be executed by all processing systems but is only active when initiated by a user. Thus the swap-control processes on processing systems 102 and 103 remain dormant and process 1204 on processing system 101 controls the framestore swap.

Firstly, swap-control process 1204 sends a swap request to processing systems 102 and 103. Identical responding daemons 1205 and 1206 on processing systems 102 and 103 respectively check the status of the processors, and each sends back an answer which either allows or rejects the swap. Again, this daemon is resident on all processing systems but only starts up when a request is received from a swap-control process on another processing system.

Provided the decisions from daemons 1205 and 1206 are favourable, process 1204 sends metadata 1241, including location data, via the Ethernet to processing system 103, as illustrated by path 1207. This metadata, currently stored on the hard drive of processing system 102, relates to framestore 112, and so must be sent to the new controller of framestore 112. Similarly process 1204 also transfers metadata 541, including location data, from processing system 103 to processing system 102 via the Ethernet as illustrated by path 1208.

Process 1204 then sends a request to the switch-control daemon 1209 running on processing system 101 to swap the framestores, as illustrated by path 1210. This daemon disconnects connections 1201 and 1202 and connects processing system 102 to framestore 113, as illustrated by connection 1211, and processing system 103 to framestore 112, as illustrated by connection 1212. It then updates the switch connections data 342.

Hence, the first processing system is disconnected from the first framestore and reconnected to the second framestore means, the second processing system is disconnected from the second framestore and reconnected to the first framestore, said first processing system reads the second location data to enable direct access to the reconnected second framestore, and said second processing system reads the first location data to enable direct access to said reconnected second framestore.

Lastly, the swap-control process 1204 on processing system 101 informs network configuration threads 1213 on processing systems 102 and 1214 on processing system 103 that they are now connected to different framestores, as illustrated by paths 1215 and 1216 respectively. These threads ensure that the network configuration files on all Ethernet-connected processing systems are kept up-to-date, including the ones on systems 101, 102 and 103.

The processing systems are now physically connected to each other's framestores, and since the metadata has also been transferred, when the applications are restarted on each processor the situation appears exactly as it was, since on each hard drive there is metadata which correctly maps the connected framestore. The fact that it is a different framestore is not apparent to any applications which may run on either system.

FIG. 13

Figure 13:
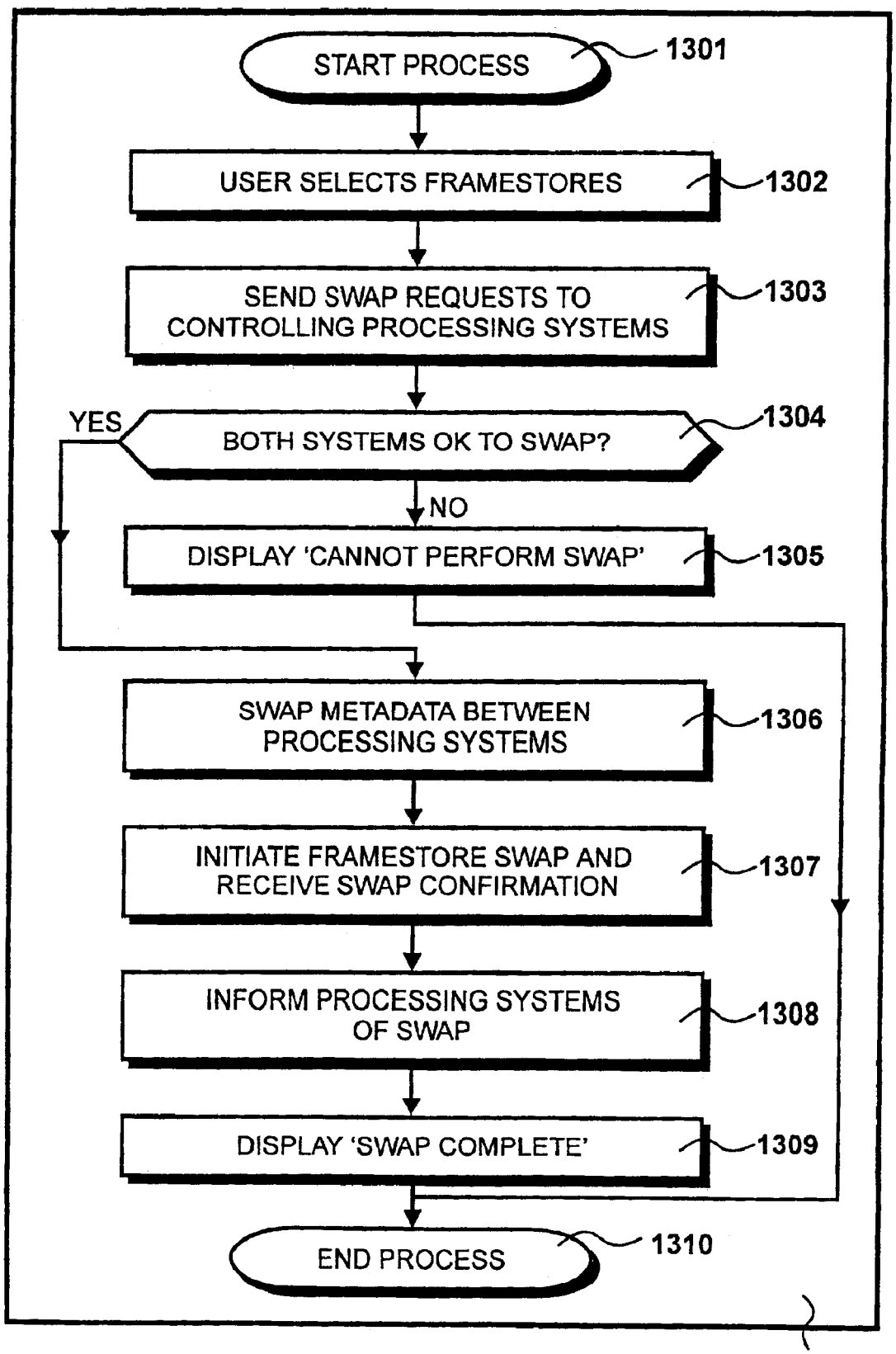
FIG. 13 illustrates the swap-control process as shown in FIG. 12.

FIG. 13 details swap-control process 1204. This process resides on all processing systems 108 to 108, but in this example is executed by processing system 101. The process may be executed on a system involved in the swap, but may also, as in this example, be executed on an uninvolved processing system. At step 1301, the process is started when the user of processing system 101 indicates that he would like to initiate a swap of framestores.

At step 1302 the user selects the two framestores which he would like to swap between their respective processing systems. In this example, the framestores are 112 and 113.

At step 1303 the process sends swap requests to the two processing systems which control the selected framestores. In this example, the systems are 102 and 103.

At step 1304 the process receives answers from processing systems 102 and 103 indicating whether or not the swap may go ahead. This is decided by daemons 1205 and 1206 on processing systems 102 and 103 respectively, which are initiated by the requests sent by processing system 101 at step 1303. If the answer from either processing system is negative then at step 1305 the message 'CANNOT PERFORM SWAP' is displayed to the user of processing system 101. Control is then directed to step 1310 at which the process ends.

If the answers received at step 1304 are both in the affirmative, then at step 1306 the metadata is swapped between processing systems 102 and 103.

At step 1307 switch control daemon 1209 running on processing system 101 is instructed to physically swap the framestores.

When confirmation has been received from daemon 1209 that the swap has been completed, then at step 1308 processing systems 102 and 103 are informed of their new configurations.

At step 1309 the message 'SWAP COMPLETE' is displayed to the user and at step 1310 the process ends.

FIG. 14

Figure 14:
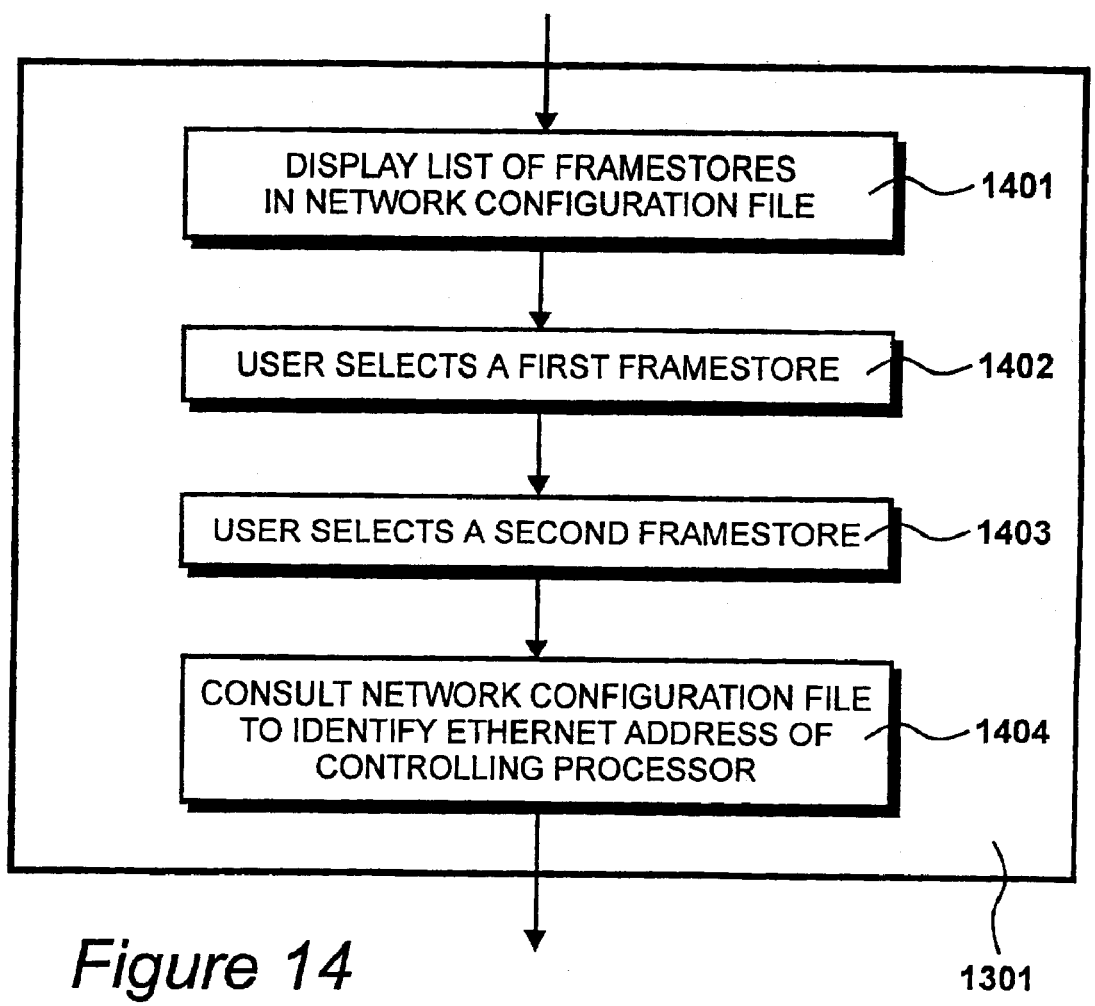
FIG. 14 details steps carried out in FIG. 13 at which the user selects framestores.

FIG. 14 details step 1302 at which two framestores are selected by the user. At step 1401 the network configuration file 343 on processing system 101 is interrogated and the list of framestores which it contains is displayed to the user of processing system 101.

At step 1402 the user selects one of these framestores as the first framestore to be involved in the swap, in this example 112, and at step 1403 the user selects a second framestore, in this example 113.

At step 1404 the network configuration file 343 is again consulted to identify the Ethernet addresses of the first and second processing systems which control the first and second framestores respectively. In this example the first processing system is 102 and the second processing system is 103. These are the addresses to which the swap requests are sent at step 1303.

FIG. 15

Figure 15:
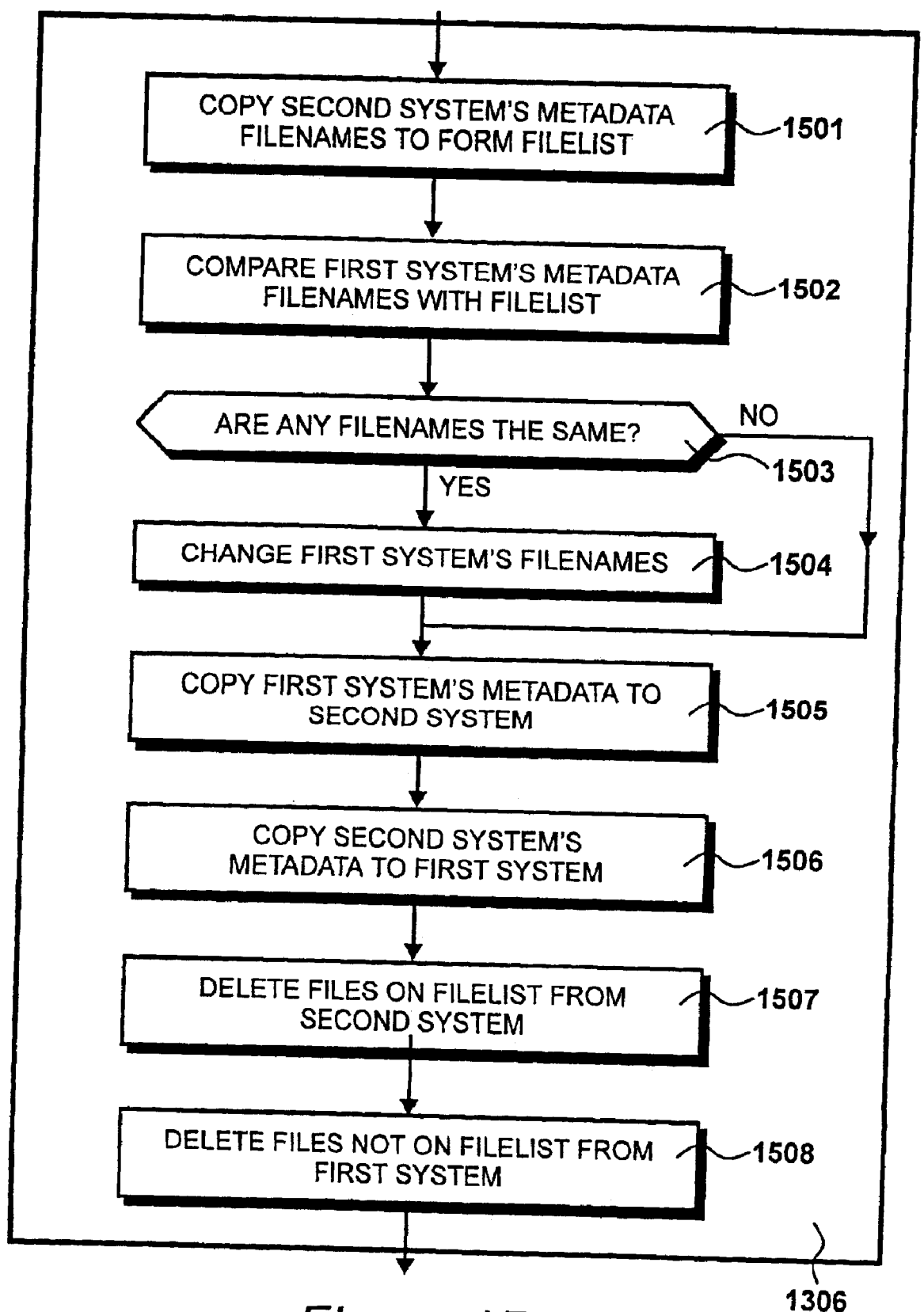
FIG. 15 details steps carried out in FIG. 13 to swap metadata between processing systems.

FIG. 15 details step 1306 at which the metadata is swapped between the two processing systems, provided both systems have agreed to the swap. At step 1501 the filenames of the metadata on the second processing system 103 are copied to form a filelist, and at step 1502 this filelist is compared with the filenames of the metadata on the first processing system 102.

At step 1503 the question is asked as to whether any of these filenames are the same. If the question is answered in the negative then control is directed to step 1505. If it is answered in the affirmative then at step 1504 any of the first processing system's filenames which are the same as those on the filelist are changed.

At step 1505 the metadata on the first processing system 102 is copied to the second processing system 103. At step 1506 the metadata on the second processing system 103 is copied to the first processing system 102. At step 1507 any files which have filenames on the filelist are deleted from the second processing system.

At step 1508 any files which have filenames not on the filelist are deleted from the first processing systems.

This completes the swap of the metadata.

FIG. 16

Figure 16:
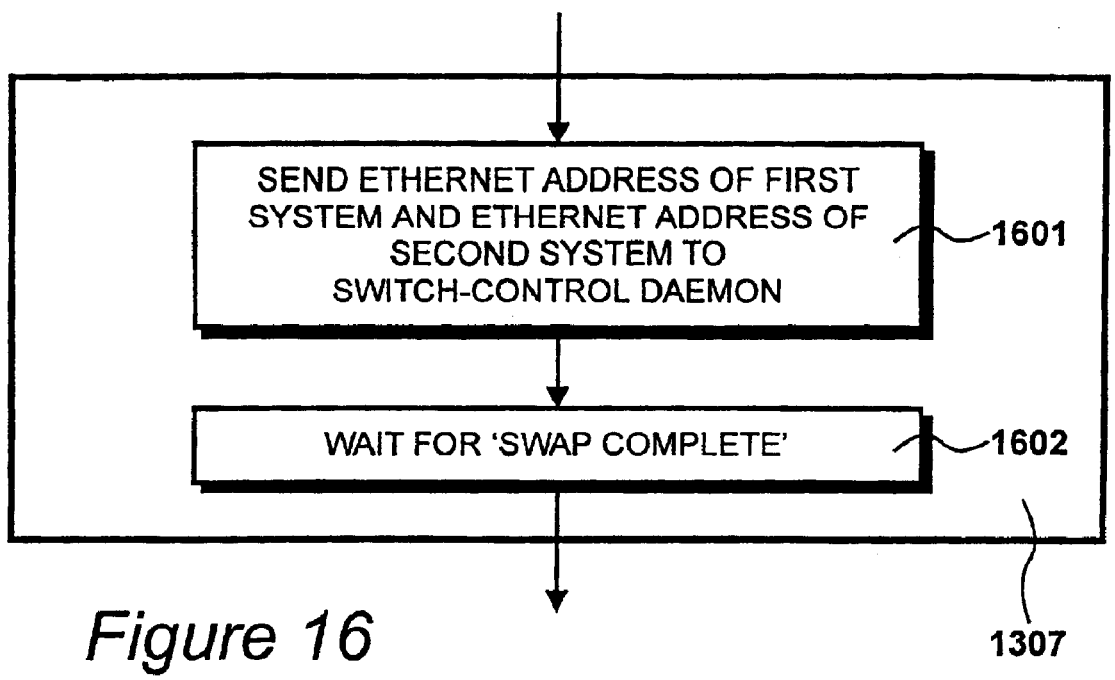
FIG. 16 details steps carried out in FIG. 13 to initiate the physical framestore swap.

FIG. 16 details step 1307 at which the physical framestore swap is initiated. At step 1601 the Ethernet addresses of processing systems 102 and 103, as identified at step 1404, are sent to switch-control daemon 1209, resident on processing system 101, which will perform the actual switch. In this example, since the swap-control process is running on processing system 101, the system in effect sends the message to itself.

At step 1602 the process waits for 'SWAP COMPLETE' to be returned from the switch control daemon 1209.

FIG. 17

Figure 17:
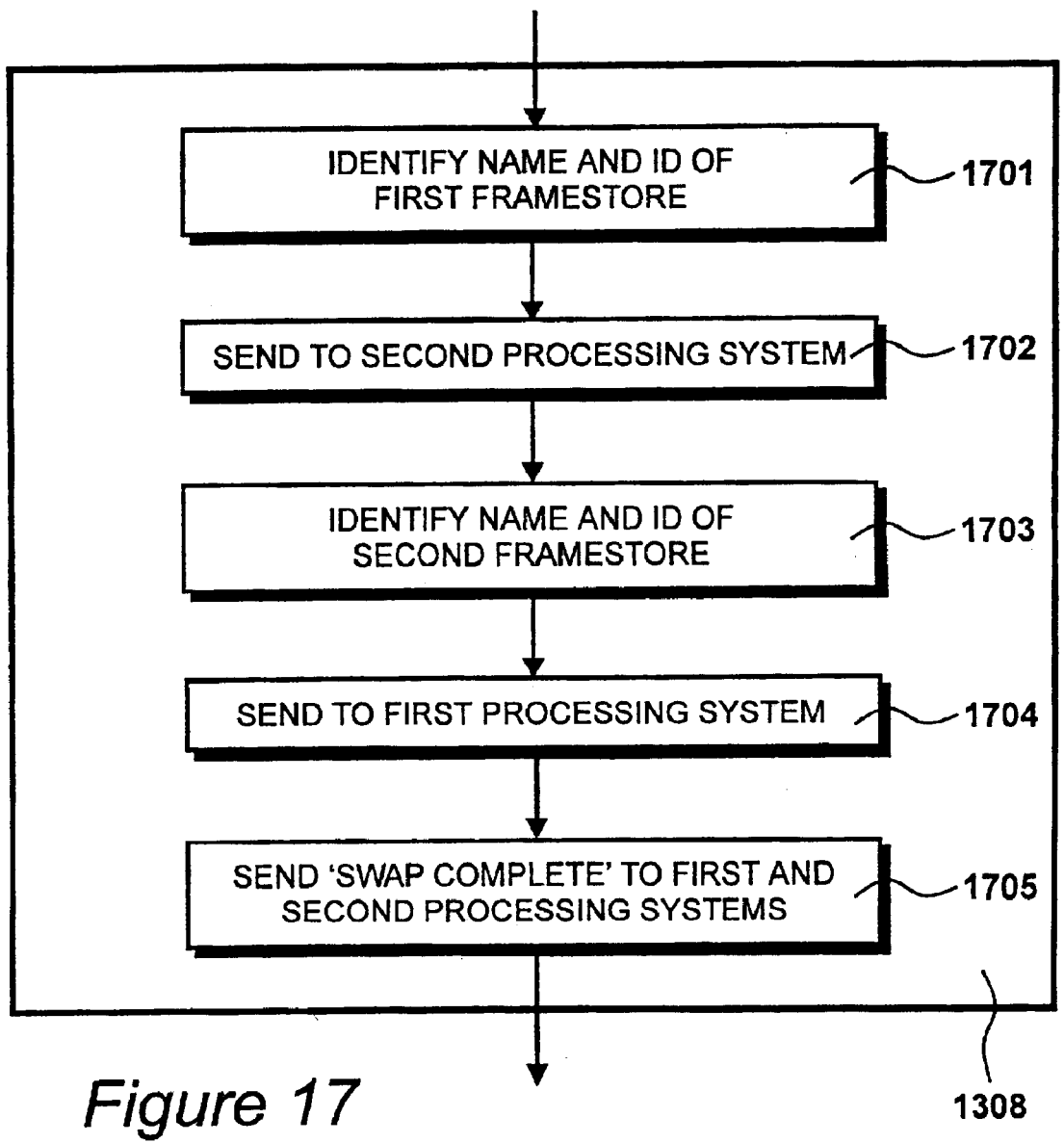
FIG. 17 details steps carried out in FIG. 13 to inform processing systems of the swap.

FIG. 17 details step 1308 at which the processing systems are informed of the swap.

At step 1701 the framestore name and ID corresponding to the Ethernet address of the first processing system 102 are identified by interrogating network configuration file 343, and at step 1702 this information is sent to the second processing system 103. The information within network configuration file 343 still reflects the state of the network before the swap, and hence the information associated with the first processing system belongs to the first framestore, which is now controlled by the second processing system.

Similarly, at step 1703 the framestore name and ID corresponding to the Ethernet address of the second processing system 103 are identified, and at step 1704 this information is sent to the first processing system 102.

These messages are caught by threads 1213 and 1214 running on 102 and 103 respectively. The threads may now update their local configurations and announce them on the network, so that all other processing systems update their network configuration files accordingly and are aware of the swap.

At step 1705 the message 'SWAP COMPLETE' is sent to processing systems 102 and 103, to be picked up by daemons 1205 and 1206 respectively. The systems can now display 'SWAP COMPLETE' to their users.

FIG. 18

Figure 18:
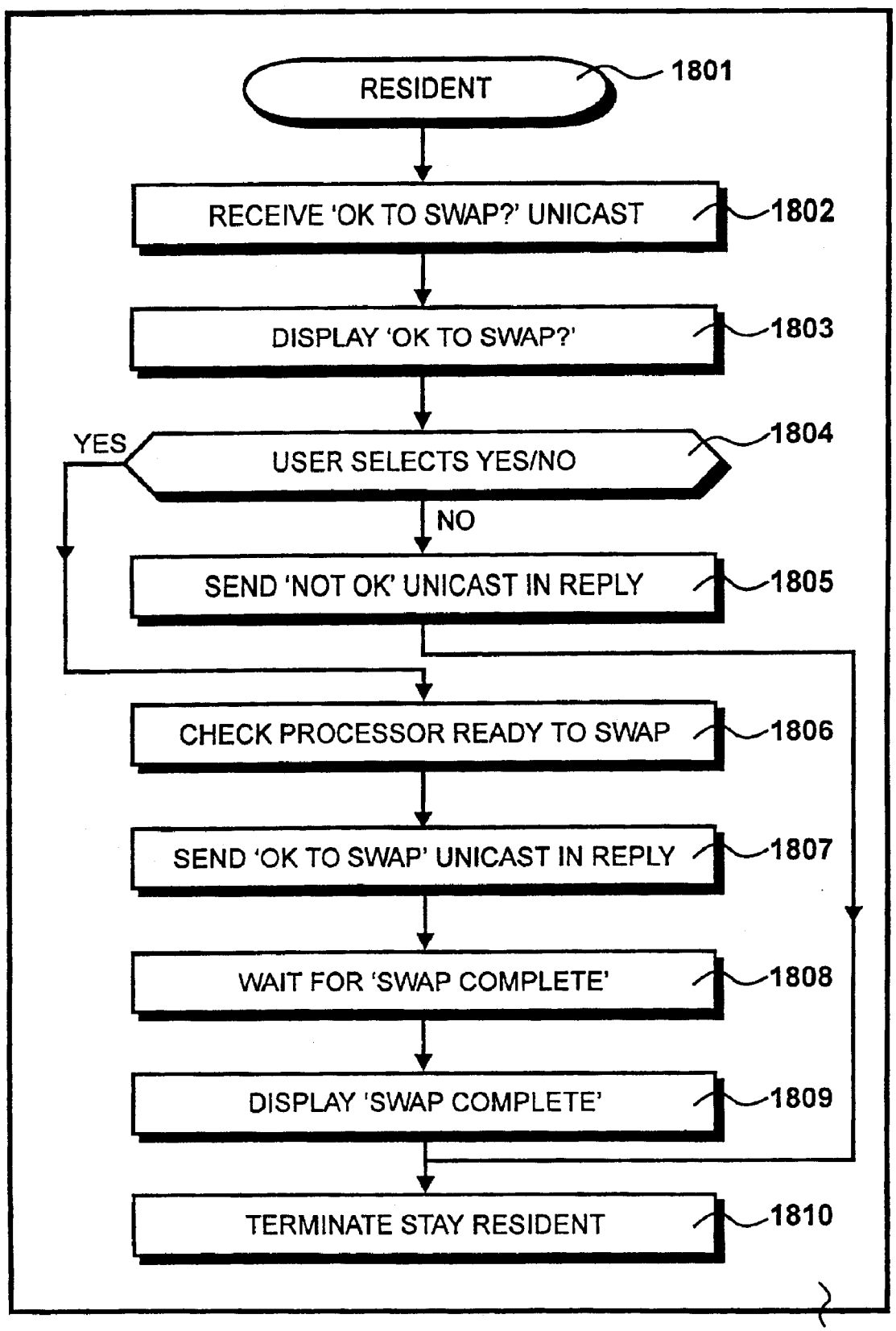
FIG. 18 illustrates the responding daemon as shown in FIG. 12.

FIG. 18 details responding daemon 1205 which runs on a processing system involved in the swap. This daemon is resident on all processing systems 101 to 108 but is only started on receipt of a swap request, such as those sent by process 1204 at step 1303. This example shows the daemon running on processing system 102, but an identical daemon runs on processing system 103. Both systems must give permission before the swap can be initiated.

Residency is illustrated by step 1801.

At step 1802 the swap request sent by process 1204 at step 1303 is received asking if a swap may take place. It is envisaged that users of processing systems would agree beforehand to perform a swap and therefore at step 1803 the message 'OK TO SWAP?' is displayed to the user.

At step 1804 the user selects 'YES' or 'NO'. If the user selects 'NO', then at step 1805 a message is sent to processing system 101 indicating that a swap cannot take place. Control is then directed to step 1810 at which the daemon terminates.

If the user selects 'YES' at step 1804 then at step 1806 the daemon checks if processing system 102 is ready to swap, and then at step 1807 sends a message to processing system 101 indicating that the swap may take place.

At step 1808 the daemon waits for 'SWAP COMPLETE' to be received from swap-control process 1204 and at step 1809 'SWAP COMPLETE' is displayed to the user.

At step 1810 the daemon terminates and stays resident.

FIG. 19

Figure 19:
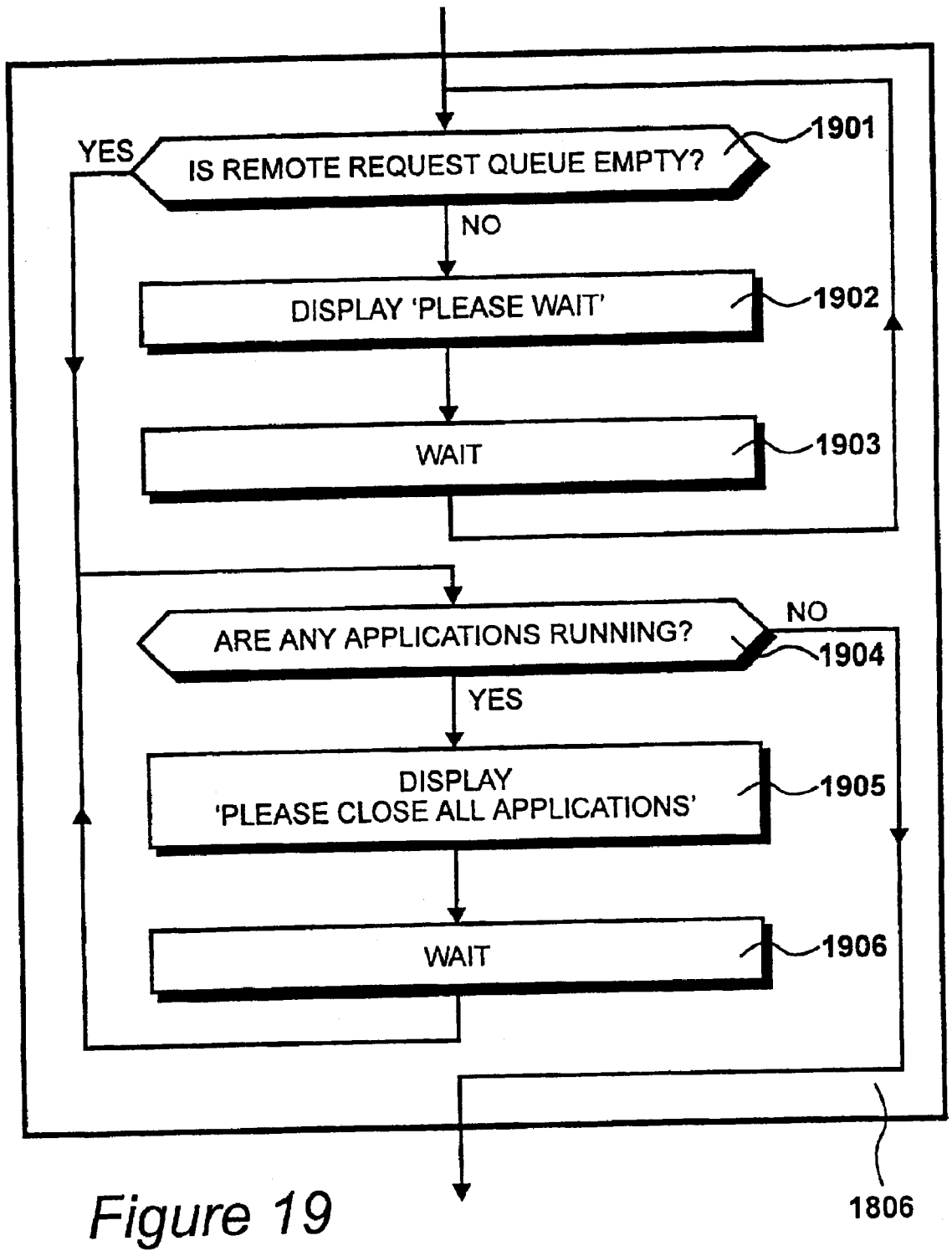
FIG. 19 details steps carried out in FIG. 18 to check if a processing system is ready to swap.

FIG. 19 details step 1806, at which daemon 1205 checks that processing system 102 is ready to swap.

At step 1901 the question is asked as to whether the remote request queue is empty. This is the queue containing requests made by other processing systems for access to the framestore which processing system 102 controls. This queue must be empty before the swap occurs because these requests are for access to framestore 112, and once the swap has been completed processing system 102 will no longer control that framestore.

Hence, if the question asked at step 1901 is answered in the negative then at step 1902 the message 'PLEASE WAIT' is displayed to the user. At step 1903 the process waits for a specified amount of time before returning to step 1901 to ask again if the queue is empty.

This loop will be performed until the queue is empty and the question asked at step 1901 is answered in the affirmative. At this point, control is directed to step 1904 where the question is asked as to whether any applications which require access to the framestore or metadata are currently running on processing system 102. If this question is answered in the affirmative then the message 'PLEASE CLOSE ALL APPLICATIONS' is displayed to the user at step 1905.

At step 1906 the process waits before returning to step 1904 to ask again if the applications are running. This loop will be performed until all applications have been shut down at which point the question asked at step 1904 will be answered in the negative. Processing system 102 is now ready to swap.

FIG. 20

Figure 20:
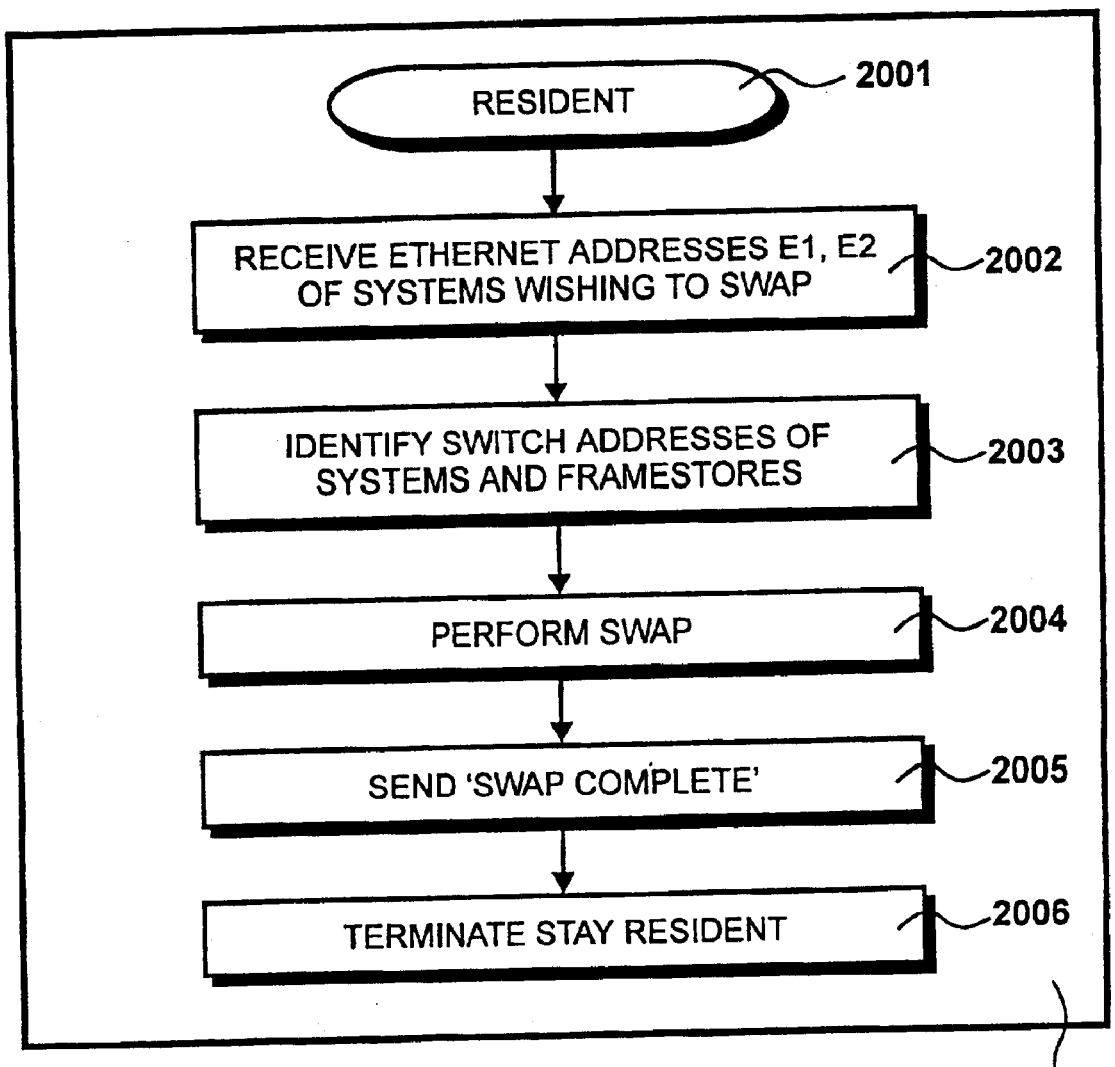
FIG. 20 illustrates the switch-control daemon as shown in FIG. 12.

FIG. 20 illustrates switch control daemon 1209. This daemon is resident on processing system 101 and not on any of processing systems 102 to 108. Residency is illustrated by step 2001.

At step 2002 the daemon starts when the message sent by process 1204 at step 1601 is received, containing the Ethernet addresses of processing systems 102 and 103. These are labelled E1 and E2.

At step 2003 the addresses inside the fibre channel switch for the two processing systems and their framestores are identified.

At step 2004 the swap is performed and at step 2005 the message 'SWAP COMPLETE' is sent to swap-control process 1204.

At step 2006 the daemon terminates and stays resident.

FIG. 21

Figure 21:
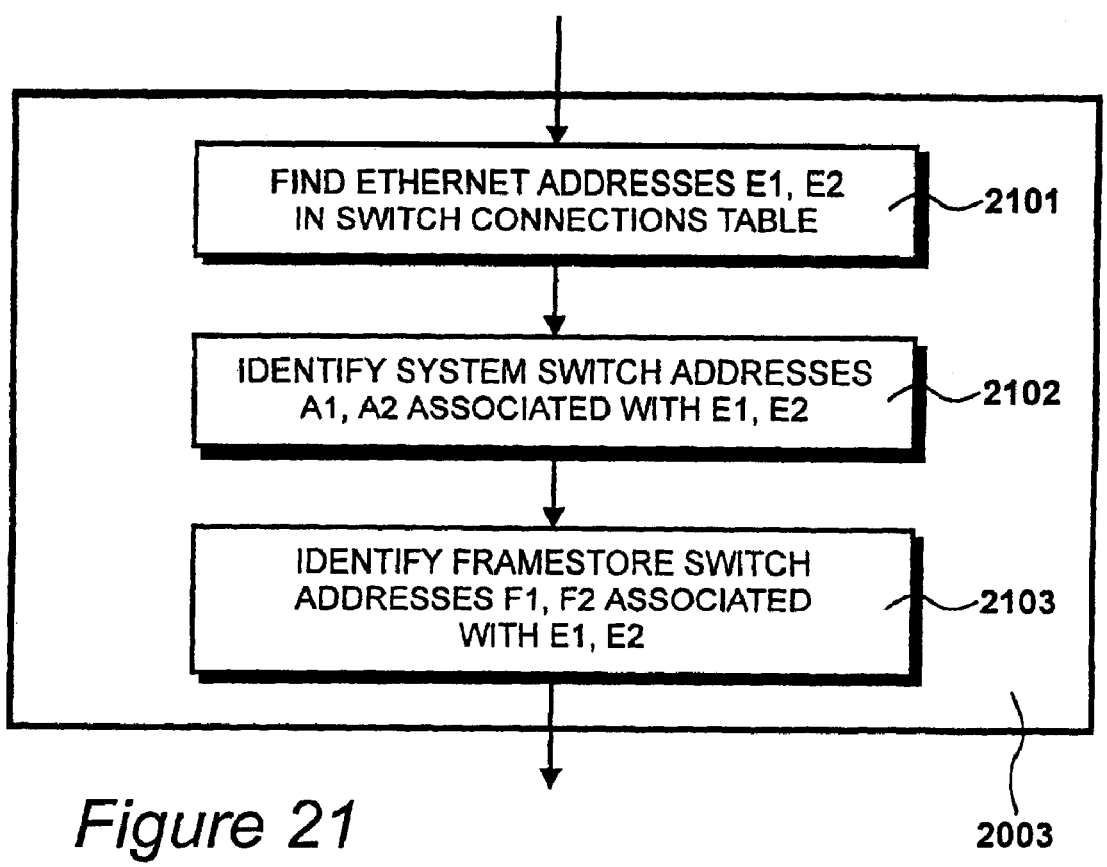
FIG. 21 details steps carried out in FIG. 20 to identify switch addresses.

FIG. 21 details step 2003 at which the switch addresses are identified. This identification is performed by consulting switch connection table 342 as shown in FIG. 10.

At step 2101, column 1001 is searched to find the Ethernet addresses E1 and E2 received at step 2002.

At step 2102 the processing system switch addresses associated with Ethernet addresses E1 and E2 are found and labelled A1 and A2.

At step 2103 the framestore switch addresses associated with Ethernet addresses E1 and E2 are found and labelled F1 and F2.

FIG. 22

Figure 22:
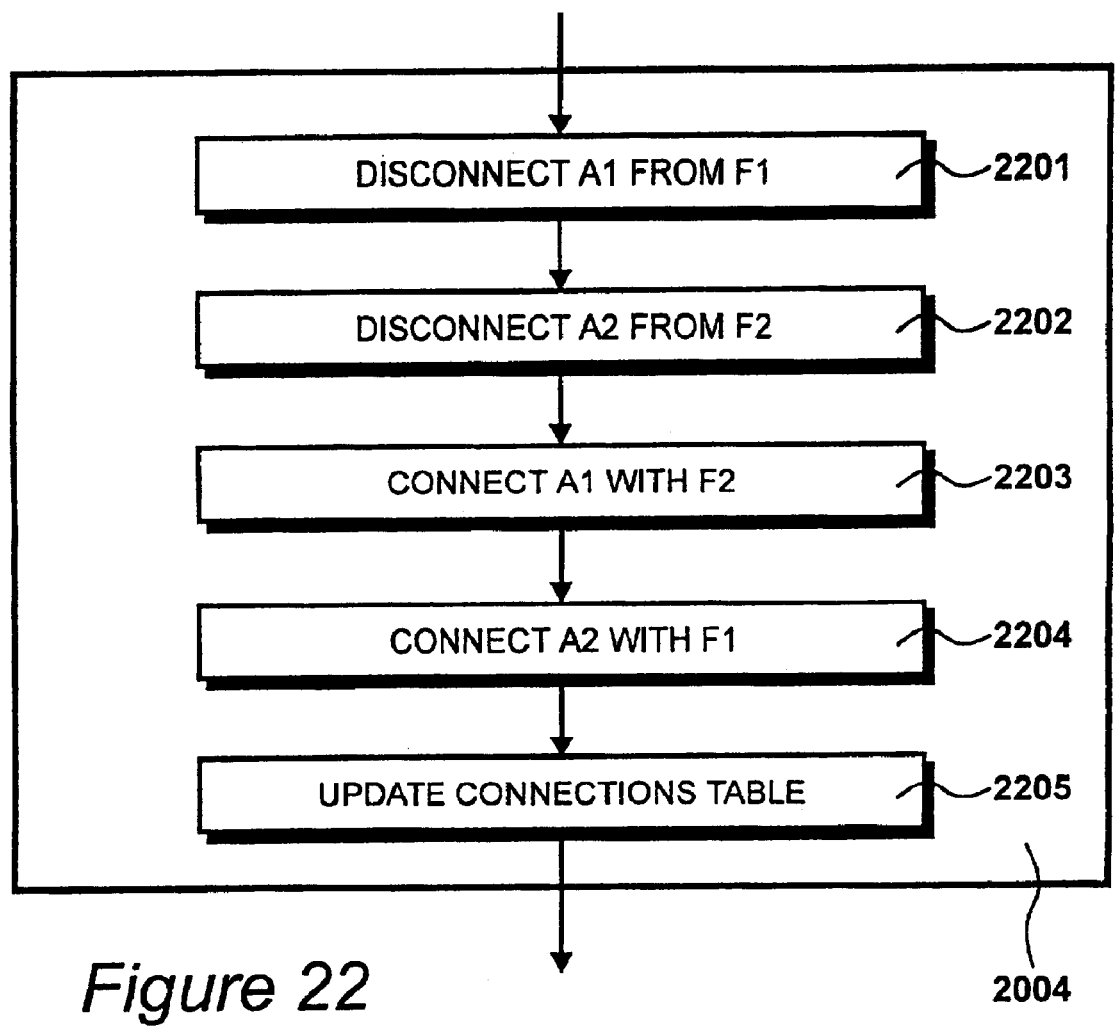
FIG. 22 details steps carried out in FIG. 20 to perform the framestore swap.

FIG. 22 details step 2004 at which the physical framestore swap is performed. At step 2201 system switch address A1 is disconnected from framestore switch address F1 and at step 2202 system switch address A2 is disconnected from framestore switch address F2.

At step 2203 system switch address A1 is connected with framestore switch address F2, and at step 2204 system switch address A2 is connected with framestore switch address F1.

At step 2205, switch connections data 342 is updated by swapping the relevant framestore switch address entries in column 1003.

What we claim is:

1. Image data processing apparatus, comprising:
   a first image processing system;
   a first frame storage means connected to said first image processing system via a high bandwidth connection, wherein said first image processing system reads first location data to identify the location of frames on said first frame storage means;
   a second image processing system; and
   a second frame storage means connected to said second image processing system via a high bandwidth connection, wherein said second image processing system reads second location data to identify the location of frames on said second frame storage means;
   wherein:
   said first image processing system is disconnected from said first frame storage means and reconnected to said second frame storage means;
   said second image processing system is disconnected from said second frame storage means and reconnected to said first frame storage means;
   said first location data is transferred to said second image processing system;
   said second location data is transferred to said first image processing system;
   said first image processing system reads said second location data to enable direct access to said reconnected second storage means; and
   said second image processing system reads said first location data to enable direct access to said reconnected first storage means.

2. Apparatus according to claim 1, wherein each of said first and second frame storage means, include a plurality of disks configured to receive image stripes.

3. Apparatus according to claim 2, wherein said disks are configured as a redundant array of inexpensive disks (RAID).

4. Apparatus according to claim 1, wherein said bandwidth connection includes a high bandwidth switching means.

5. Apparatus according to claim 4, wherein said high bandwidth switching means is a fibre channel switch.

6. Apparatus according to claim 4, wherein said high bandwidth switching means is switched under the control of said first image processing system.

7. The apparatus of claim 1 wherein:
   the first location data is part of first metadata that is transferred from the first image processing system to the second image processing system adnd read by the second image processing system; and
   the second location data is part of second metadat that is transferred from the second image processing system to the first image processing system and read by the first image processing system.

8. Apparatus according so claim 1, including a low bandwidth network connecting said first image processing system to said second image processing system, wherein said location data is transferred over said low bandwidth network.

9. Apparatus according to claim 8, wherein said low bandwidth network is an Ethernet network.

10. Apparatus according to claim 1, including a local disk drive, wherein said location data is stored on said local disk drive.

11. A method of processing image data comprising:
    reading first location data to identify a first location of frames on a first frame storage means at a first image processing system;
    reading second location data to identify a second location of frames on a second frame storage means at a second image processing system;
    disconnecting said first image processing system from said first storage means reconnecting said first image processing system to said second frame storage means;
    disconnecting said second image processing system from said second frame storage means and reconnecting said second image processing system to said first frame storage means;
    transferring said first location data to said second image processing system;
    transferring said second location data to said first image processing system;
    reading said second location data at said first image processing system to enable direct access to said reconnected second storage means; and
    reading said first location data at said second image processing system to enable direct access to said reconnected first storage means.

12. A method according the claim 11, wherein said image data consists of a plurality of image frames and wherein each of said image frames is stored by being striped over a plurality of disks.

13. A method according to claim 12, wherein said striping procedure includes the generation of redundant data.

14. A method according to claim 11, wherein said image data is transferred between an image processing system and a frame storage means over a high bandwidth switch.

15. A method according to claim 14, wherein said high band width switch is a fibre channel switch facilitating the transfer of image data at display rate or at multiples of said display rate.

16. A method according to claim 14, wherein said first image processing system is configured to switch said high bandwidth switching means.

17. The method of claim 11 wherein:
    the first location data is part of first metadata that is transferred from the first image processing system to the second image processing system and read by the second image processing system; and
    the second location data is part of second metadata that is transferred from the second image processing system to the first image processing system and read by the first image processing system.

18. A method according to claim 11, wherein said transfer of location data occurs over a low bandwidth network connecting said first image processing system to said second image processing system, wherein the transition rate of said low bandwidth network is less than that required for image display.

19. A method according to claim 18, wherein said low bandwidth network operates under Ethernet protocols.

20. A method according to claim 11, wherein location data is stored on respective local disk drives.

* * * * *

UNITED STATES PATENT AND TRADEMARK OFFICE
CERTIFICATE OF CORRECTION

PATENT NO.         : 6,981,057 B2
APPLICATION NO.    : 10/124093
DATED              : December 27, 2005
INVENTOR(S)        : Eric Y. Theriault et al.

It is certified that error appears in the above-identified patent and that said Letters Patent is hereby corrected as shown below:

Please add the following references to the FRONT PAGE of the patent; Item (56), References Cited

| | | |
|---|---|---|
| --US2002/0165930 | 11/2002 | Theriault et al. |
| US2002/0145749 | 10/2002 | Catt et al. |
| US2002/0106184 | 08/2002 | Belley et al. |
| US2001/0029612 | 10/2001 | Harnois |
| 4,056,843 | 11/1974 | Bishop et al. |
| 4,500,908 | 02/1985 | Mandeberg |
| 4,530,048 | 07/1985 | Proper |
| 4,577,240 | 03/1986 | Hedberg et al. |
| 4,855,813 | 08/1989 | Russel et al. |
| 5,027,212 | 06/1991 | Marlton et al. |
| 5,157,511 | 10/1992 | Kawai et al. |
| 5,185,860 | 02/1993 | Wu |
| 5,208,813 | 05/1993 | Stallmo |
| 5,247,347 | 09/1993 | Litteral et al. |
| 5,265,098 | 11/1993 | Mattson et al. |
| 5,278,838 | 01/1994 | Ng et al. |
| 5,309,560 | 05/1994 | Abe et al. |
| 5,369,532 | 11/1994 | Dodt et al |
| 5,371,896 | 12/1994 | Gove et al. |

UNITED STATES PATENT AND TRADEMARK OFFICE
CERTIFICATE OF CORRECTION

PATENT NO. : 6,981,057 B2
APPLICATION NO. : 10/124093
DATED : December 27, 2005
INVENTOR(S) : Eric Y. Theriault et al.

It is certified that error appears in the above-identified patent and that said Letters Patent is hereby corrected as shown below:

Please add the following references to the FRONT PAGE of the patent; Item (56), References Cited (cont'd)

| | | |
|---|---|---|
| 5,448,695 | 01/1996 | Cutter |
| 5,452,235 | 09/1995 | Isani |
| 5,455,628 | 10/1995 | Bishop |
| 5,469,308 | 11/1995 | Hamoda et al. |
| 5,479,210 | 12/1995 | Cawley et al. |
| 5,499,341 | 03/1996 | Wilson et al. |
| 5,510,905 | 04/1996 | Birk |
| 5,517,612 | 05/1996 | Dwin et al. |
| 5,530,557 | 06/1996 | Asit et al. |
| 5,530,850 | 06/1996 | Ford et al. |
| 5,537,568 | 07/1996 | Yanai et al. |
| 5,559,764 | 09/1996 | Chen et al. |
| 5,568,180 | 10/1996 | Okamoto |
| 5,572,640 | 11/1996 | Schettler |
| 5,583,653 | 12/1996 | Timmermans |
| 5,590,381 | 12/1996 | Mourad |
| 5,598,276 | 01/1997 | Cookson et al. |
| 5,611,056 | 03/1997 | Hotchkin |
| 5,623,595 | 04/1997 | Bailey |

UNITED STATES PATENT AND TRADEMARK OFFICE
CERTIFICATE OF CORRECTION

| | |
|---|---|
| PATENT NO. | : 6,981,057 B2 |
| APPLICATION NO. | : 10/124093 |
| DATED | : December 27, 2005 |
| INVENTOR(S) | : Eric Y. Theriault et al. |

It is certified that error appears in the above-identified patent and that said Letters Patent is hereby corrected as shown below:

Please add the following references to the FRONT PAGE of the patent; Item (56), References Cited (cont'd)

| | | |
|---|---|---|
| 5,671,386 | 09/1997 | Blair et al. |
| 5,671,389 | 09/1997 | Saliba |
| 5,678,023 | 10/1997 | Adams et al. |
| 5,696,905 | 12/1997 | Reimer et al. |
| 5,719,983 | 02/1998 | Henderson et al. |
| 5,719,985 | 02/1998 | Ito et al. |
| 5,720,037 | 02/1998 | Biliris et al. |
| 5,751,336 | 05/1998 | Aggarwal et al. |
| 5,754,730 | 05/1998 | Windrem et al. |
| 5,758,057 | 05/1998 | Baba et al. |
| 5,768,623 | 06/1998 | Judd et al. |
| 5,771,354 | 06/1998 | Crawford |
| 5,818,439 | 10/1998 | Nagasaka et al. |
| 5,818,542 | 10/1998 | Harnois |
| 5,845,148 | 12/1998 | Ichikawa et al. |
| 5,852,715 | 12/1998 | Raz et al. |
| 5,884,028 | 03/1999 | Kindell et al. |
| 5,884,098 | 03/1999 | Mason, Jr. |
| 5,890,203 | 03/1999 | Add |

UNITED STATES PATENT AND TRADEMARK OFFICE
CERTIFICATE OF CORRECTION

| | |
|---|---|
| PATENT NO. | : 6,981,057 B2 |
| APPLICATION NO. | : 10/124093 |
| DATED | : December 27, 2005 |
| INVENTOR(S) | : Eric Y. Theriault et al. |

It is certified that error appears in the above-identified patent and that said Letters Patent is hereby corrected as shown below:

Please add the following references to the FRONT PAGE of the patent; Item (56), References Cited (cont'd)

| | |
|---|---|
| 5,893,919 | 04/1999 Sarkozy et al. |
| 5,930,817 | 07/1999 Mizuno et al. |
| 5,968,158 | 10/1999 Andrews et al. |
| 6,055,354 | 04/2000 Bopardikar |
| 6,148,383 | 11/2000 Micka et al. |
| 6,317,137 | 1112001 Rosasco |
| 6,337,691 | 01/2002 Trainor |
| 6,393,535 | 05/2002 Burton et al. |
| 6,370,605 | 04/2002 Chong, Jr. |
| 6,553,423 | 04/2003 Chen |
| 6,629,145 | 09/2003 Pham et al. |
| 6,680,942 | 01/2004 Mead et al. |
| 6,678,809 | 01/2004 Delaney et al. |

Foreign Patent Documents

| | | |
|---|---|---|
| 0 959 587 A2 | 11/1999 | EP |
| 0 519 670 Al | 12/1992 | EP |
| 0 663 638 | 07/1995 | EP |
| 0 605 170 | 07/1994 | EP |
| 0 501 818 | 09/1992 | EP |

UNITED STATES PATENT AND TRADEMARK OFFICE
CERTIFICATE OF CORRECTION

PATENT NO. : 6,981,057 B2
APPLICATION NO. : 10/124093
DATED : December 27, 2005
INVENTOR(S) : Eric Y. Theriault et al.

It is certified that error appears in the above-identified patent and that said Letters Patent is hereby corrected as shown below:

Foreign Patent Documents (cont'd)

| | | |
|---|---|---|
| 98/10586 | 03/1998 | PCT |
| 0339270 | 02/1989 | EP |
| 0339270 | 02/1989 | EP |
| 2 273 584 | 06/1994 | GB |
| 2 278 228 | 11/1994 | GB |
| 2 297 855 | 04/1996 | GB |

Other Publications

Willner, "Transforming the PC into a TV, Radio, VCR and Video Editing Studio," Wescon 1995 Conference Record Microelectronic, Communications Technology Producing Quality Products, Mobile and Portable Power, Emerging Technologies, San Francisco, No. 7-9, 1995 7 November 1995, Institute of Electrical and Electronics Engineers, pp. 743-748

Fronczak, et al., "Motion JPEG and MPEG Solutions for Multimedia," Wescon 1995 Conference Record Microelectronic, Communications Technology Producing Quality Products, Mobile and Portable Power, Emerging Technologies, San Francisco, No. 7-9, 1995 7 November 1995, Institute of Electrical and Electronics Engineers, pp. 738-742 --

Column 13, line 54, claim 21: "adnd" should read -- and --

Column 13, line 56, claim 21: "metadat" should read -- metadata --

UNITED STATES PATENT AND TRADEMARK OFFICE
CERTIFICATE OF CORRECTION

| | | |
|---|---|---|
| PATENT NO. | : 6,981,057 B2 | |
| APPLICATION NO. | : 10/124093 | |
| DATED | : December 27, 2005 | |
| INVENTOR(S) | : Eric Y. Theriault et al. | |

It is certified that error appears in the above-identified patent and that said Letters Patent is hereby corrected as shown below:

Claim 14, line 40, claim 15: "band width" should read -- bandwidth --

Signed and Sealed this

Third Day of July, 2007

JON W. DUDAS
*Director of the United States Patent and Trademark Office*